US011729321B2

(12) United States Patent
Yamada et al.

(10) Patent No.: US 11,729,321 B2
(45) Date of Patent: *Aug. 15, 2023

(54) DISPLAY OF TWO FUNCTIONS OF DEVICE USED WITH DATA PROCESSING APPARATUS

(71) Applicant: Brother Kogyo Kabushiki Kaisha, Nagoya (JP)

(72) Inventors: Jun Yamada, Tajimi (JP); Norihiko Asai, Tajimi (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/570,606

(22) Filed: Jan. 7, 2022

(65) Prior Publication Data

US 2022/0131987 A1 Apr. 28, 2022

Related U.S. Application Data

(63) Continuation of application No. 17/117,400, filed on Dec. 10, 2020, now Pat. No. 11,223,730, which is a
(Continued)

(30) Foreign Application Priority Data

| Jun. 29, 2010 | (JP) | 2010-147430 |
| Jul. 15, 2010 | (JP) | 2010-161018 |
| Mar. 25, 2011 | (JP) | 2011-067254 |

(51) Int. Cl.
*H04N 1/00* (2006.01)
*G06F 9/50* (2006.01)

(52) U.S. Cl.
CPC .......... *H04N 1/00395* (2013.01); *G06F 9/50* (2013.01); *G06F 9/5011* (2013.01);
(Continued)

(58) Field of Classification Search
CPC .......... H04N 1/00395; H04N 1/00129; H04N 1/00204; H04N 1/00307; H04N 1/00347;
(Continued)

(56) References Cited

U.S. PATENT DOCUMENTS 7,665,084 B2  2/2010  Suzuki et al.
7,804,608 B2  9/2010  Shirai et al.
(Continued)

FOREIGN PATENT DOCUMENTS

EP  2104328 A1  9/2009
JP  2000-066853 A  3/2000
(Continued)

OTHER PUBLICATIONS

Japanese office action for patent application No. 2010-147430 dated Apr. 12, 2012.
(Continued)

*Primary Examiner* — Gabriel I Garcia
(74) *Attorney, Agent, or Firm* — Banner & Witcoff, Ltd.

(57) ABSTRACT

A data processing apparatus is configured to receive a selection of a first function and search for one or more devices which has the capability to perform that first function. The apparatus may then receive a selection of the one or more devices for performing that first function and, in conjunction, determine whether the selected device has the capability to execute a second function. The device identification data may be stored. Subsequently, if the selected device is determined to be capable of executing the second function, which is different from the first function selected, and the second function is further selected, the previously selected device may be displayed as having the capability to execute the selected second function. Otherwise, the apparatus does not display the previously selected device as being able to execute the selected second function.

9 Claims, 28 Drawing Sheets

Related U.S. Application Data continuation of application No. 16/508,679, filed on Jul. 11, 2019, now Pat. No. 10,868,926, which is a continuation of application No. 15/933,513, filed on Mar. 23, 2018, now Pat. No. 10,375,257, which is a continuation of application No. 15/378,678, filed on Dec. 14, 2016, now Pat. No. 9,942,423, which is a continuation of application No. 15/058,652, filed on Mar. 2, 2016, now Pat. No. 9,538,025, which is a continuation of application No. 13/166,044, filed on Jun. 22, 2011, now Pat. No. 9,294,647.

(52) U.S. Cl.
CPC ..... *H04N 1/00129* (2013.01); *H04N 1/00204* (2013.01); *H04N 1/00307* (2013.01); *H04N 1/00347* (2013.01); *H04N 1/00408* (2013.01); *H04N 1/00503* (2013.01); *H04N 1/00912* (2013.01); *H04N 1/00938* (2013.01); *H04N 2201/007* (2013.01); *H04N 2201/0075* (2013.01); *H04N 2201/0094* (2013.01)

(58) Field of Classification Search
CPC .......... H04N 1/00408; H04N 1/00503; H04N 1/00912; H04N 1/00938; H04N 2201/007; H04N 2201/0075; H04N 2201/0094; G06F 9/50; G06F 9/5011
USPC ................................................ 358/1.1–1.18
See application file for complete search history.

(56) References Cited

U.S. PATENT DOCUMENTS

| | | |
|---|---|---|
| 7,984,120 B2 | 7/2011 | Yoshida |
| 8,010,583 B2 | 8/2011 | Matsunaga |
| 8,264,711 B2 | 9/2012 | Takahashi |
| 8,306,977 B1 | 11/2012 | Gildfind |
| 8,332,332 B2 | 12/2012 | Carlson et al. |
| 8,356,084 B2 | 1/2013 | Yamamoto |
| 8,468,173 B2 | 6/2013 | Nakajima |
| 9,191,539 B2 | 11/2015 | Yamada et al. |
| 9,253,347 B2 | 2/2016 | Asai |
| 9,294,647 B2 | 3/2016 | Yamada et al. |
| 9,538,025 B2 | 1/2017 | Yamada |
| 10,375,257 B2 | 8/2019 | Yamada et al. |
| 2003/0101236 A1 | 5/2003 | Ohara |
| 2004/0034862 A1 | 2/2004 | Kadota |
| 2004/0250265 A1 | 12/2004 | Suzuki et al. |
| 2005/0018236 A1 | 1/2005 | Shirai et al. |
| 2005/0146755 A1 | 7/2005 | Shimokawa et al. |
| 2006/0026600 A1 | 2/2006 | Yoshida |
| 2009/0013065 A1 | 1/2009 | Nagashima |
| 2009/0237728 A1 | 9/2009 | Yamamoto |
| 2010/0011369 A1 | 1/2010 | Uchida |
| 2010/0328689 A1 | 12/2010 | Koo et al. |
| 2011/0208881 A1 | 8/2011 | Abe |
| 2011/0317211 A1 | 12/2011 | Yamada et al. |
| 2014/0307276 A1 | 10/2014 | Koga et al. |
| 2021/0176370 A1* | 6/2021 | Yamada ................ G06F 3/1292 |

FOREIGN PATENT DOCUMENTS

| | | |
|---|---|---|
| JP | 2001-125773 A | 5/2001 |
| JP | 2001-134399 A | 5/2001 |
| JP | 2003-157275 A | 5/2003 |
| JP | 2004-078395 A | 3/2004 |
| JP | 2004-171327 A | 6/2004 |
| JP | 2004-206229 A | 7/2004 |
| JP | 2004-295181 A | 10/2004 |
| JP | 2004-302653 A | 10/2004 |
| JP | 2005-044080 A | 2/2005 |
| JP | 2005-278143 A | 10/2005 |
| JP | 2006-041940 A | 2/2006 |
| JP | 2006-163990 A | 6/2006 |
| JP | 2006-185251 A | 7/2006 |
| JP | 2009-042902 A | 2/2009 |
| JP | 2009-187460 A | 8/2009 |
| JP | 2009-205529 A | 9/2009 |
| JP | 2009-230253 A | 10/2009 |
| JP | 2010-123103 A | 6/2010 |

OTHER PUBLICATIONS

Japanese office action for patent application No. 2011-067254 dated Jun. 19, 2012.
Office Action received in corresponding Japanese Patent Application No. 2012-164441, dated Aug. 20, 2013.
Office Action received in corresponding Chinese Patent Application No. 201110187870.0 dated Aug. 30, 2013.
Mar. 31, 2014—U.S. Restriction Requirement—U.S. Appl. No. 13/425,468.
Office Action issued in corresponding Chinese Patent Application No. 201110187870.0 dated Apr. 22, 2014.
Non-Final Office Action received in U.S. Appl. No. 13/425,468 dated Aug. 14, 2014.
Aug. 25, 2014—(EP) Extended Search Report—App 11170793.1.
Sep. 11, 2014—U.S. Non-Final Office Action—U.S. Appl. No. 14/339,733.
Sep. 9, 2014—(JP) Office Action—App 2013-087187—Eng Tran.
Canon Easy-PhotoPrint for iPhone—https://web.archive.org/web/20110718134649/http://itunes.apple.com/jp/app/canon-easy-photoprint-for/id331269951?mt=8. Retrieved Nov. 6, 2014.
Oct. 23, 2014—(CN) Notification of Third Office Action—App 201110187870.0.
Mar. 24, 2015—U.S. Final Office Action—U.S. Appl. No. 14/339,733.
Apr. 9, 2015—U.S. Ex parte Quayle Office Action—U.S. Appl. No. 13/425,468.
May 15, 2015—U.S. Final Office Action—U.S. Appl. No. 13/166,044.
Jul. 8, 2015—U.S. Notice of Allowance—U.S. Appl. No. 14/339,733.
Sep. 25, 2015—U.S. Notice of Allowance—U.S. Appl. No. 13/425,468.
Nov. 13, 2015—U.S. Notice of Allowance—U.S. Appl. No. 13/166,044.
Nov. 2, 2018—(EP) Office Action—App 11170793.1.
Oct. 8, 2019—(JP) Office Action—App 2018-196451.
May 26, 2020—(JP) Decision of Refusal—App 2018-196451.
Aug. 3, 2021—(JP) Notice of Reasons for Refusal—App 2020-141579.
May 30, 2023—(JP) Notice of Reasons for Refusal—App 2022-037840 X.

\* cited by examiner

| IP ADDRESS | MODEL NUMBER | FUNCTION | | |
|---|---|---|---|---|
| | | PRINT | SCAN | COPY |
| 211.9.36.148 | INK-MFP331 | INKJET COLOR | O | O |
| 211.9.36.132 | SCAN432 | NONE | O | NONE |
| 211.9.36.154 | LASER123 | LASER COLOR | NONE | NONE |

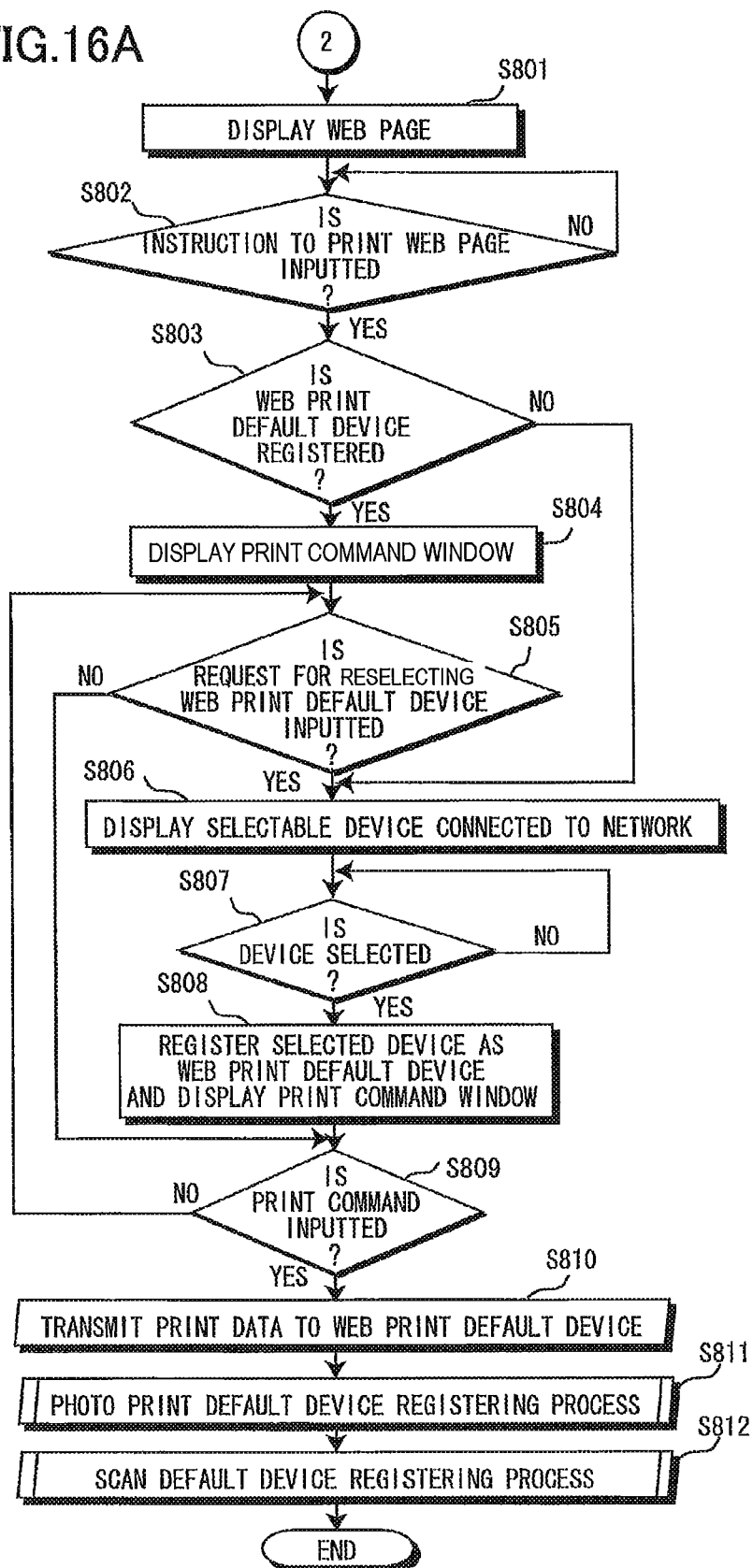

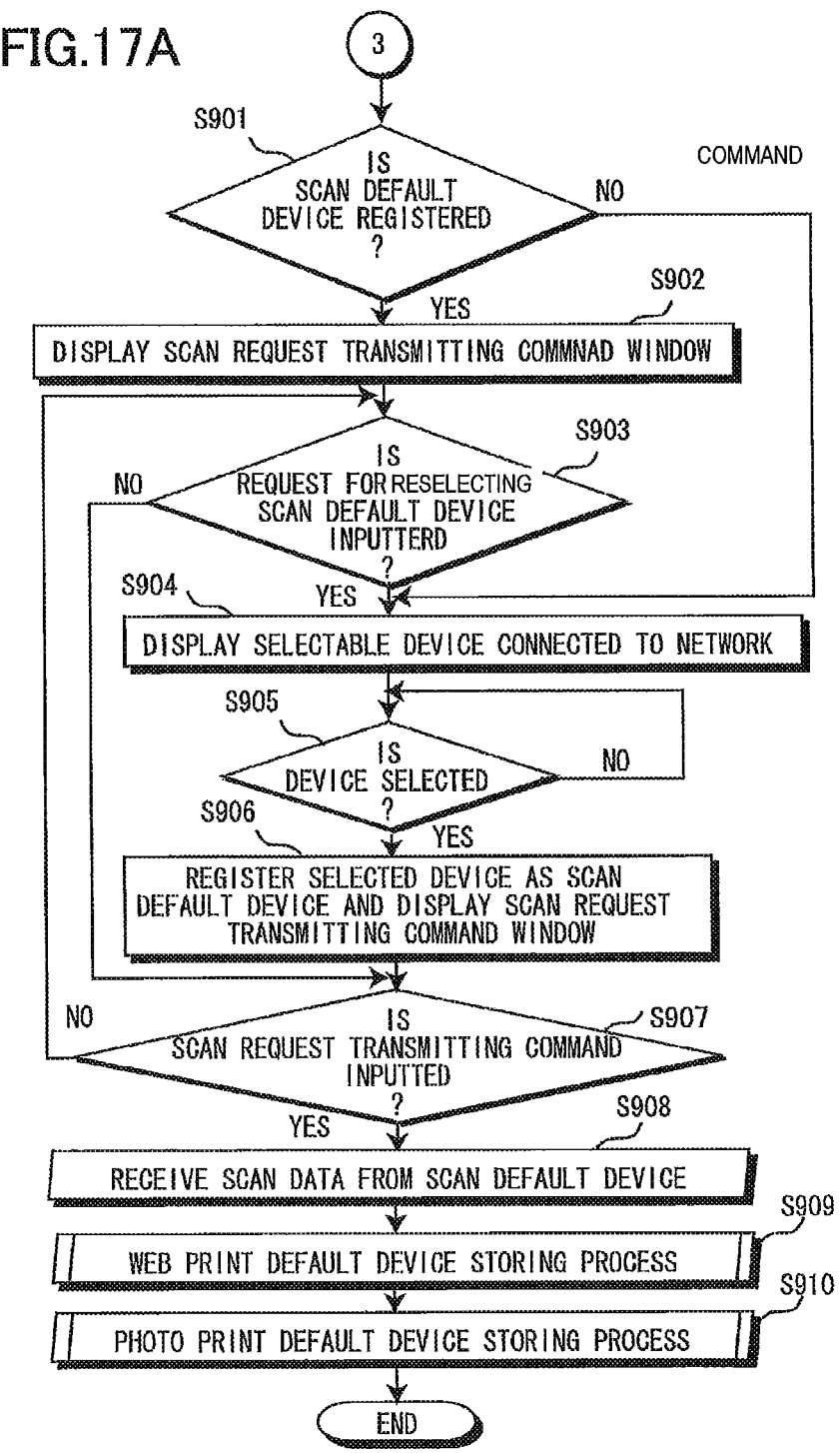

FIG.27
|  | PHOTO PRINT | WEB PRINT | SCAN |
|---|---|---|---|
| IP ADDRESS | 211.9.36.148 | 211.9.36.148 | 211.9.36.154 |
| MODEL NUMBER | INK-MFP331 | INK-MFP331 | SCAN432 |
| SETTINGS DATA | (A4, COLOR, OFF, 3) | (B5, MONO, OFF, 1) | ( ) |
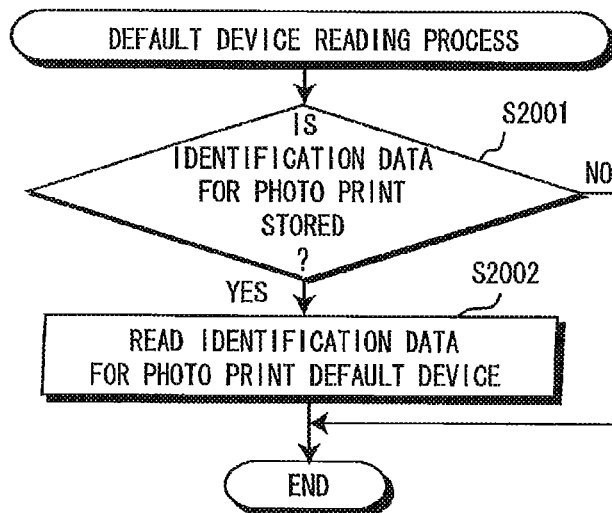
FIG.28
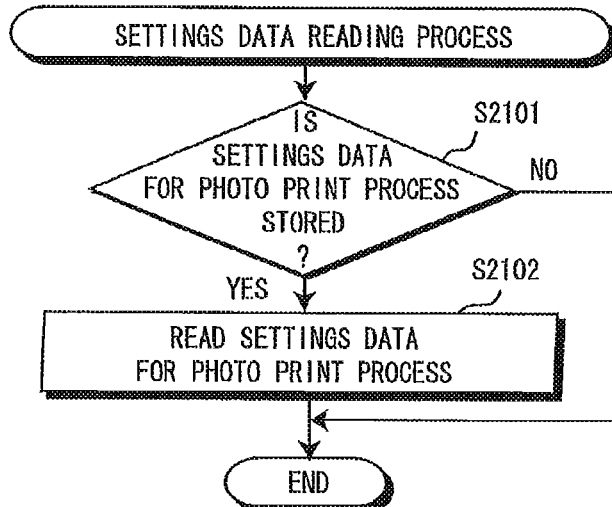
FIG.29

| FUNCTION : PHOTO PRINT<br>IP ADDRESS : 211.9.36.148<br>MODEL NUMBER : INK-MFP331<br>SETTINGS : (A4, COLOR, OFF, 3) |
|---|
| FUNCTION : WEB PRINT<br>IP ADDRESS : 211.9.36.148<br>MODEL NUMBER : INK-MFP331<br>SETTINGS : (B5, MONO, OFF, 1) |
| FUNCTION : SCAN<br>IP ADDRESS : 211.9.36.154<br>MODEL NUMBER : SCAN432<br>SETTINGS : () |

DISPLAY OF TWO FUNCTIONS OF DEVICE USED WITH DATA PROCESSING APPARATUS

CROSS REFERENCE TO RELATED APPLICATION

This application is a continuation of U.S. patent application Ser. No. 17/117,400 filed Dec. 10, 2020 which is a continuation of U.S. patent application Ser. No. 16/508,679 filed on Jul. 11, 2019, issued as U.S. Pat. No. 10,868,926 on Dec. 15, 2020, which is a continuation of U.S. application Ser. No. 15/933,513 filed Mar. 23, 2018, issued as U.S. patent application Ser. No. 10,375,257 on Aug. 6, 2019, which is a continuation of U.S. application Ser. No. 15/378,678 filed Dec. 14, 2016, now U.S. Pat. No. 9,942,423 issued on Apr. 10, 2018, which is a continuation of U.S. application Ser. No. 15/058,652 filed on Mar. 2, 2016, now U.S. Pat. No. 9,538,025 issued on Jan. 3, 2017, which is a continuation of U.S. application Ser. No. 13/166,044 filed on Jun. 22, 2011, now U.S. Pat. No. 9,294,647 issued on Mar. 22, 2016, which claims priority from Japanese Patent Applications No. 2010-147430 filed on Jun. 29, 2010, No. 2010-161018 filed on Jul. 15, 2010, and No. 2011-067254 filed on Mar. 25, 2011. The entire contents of the above noted applications are incorporated herein by reference.

TECHNICAL FIELD

The present invention relates to a data processing apparatus.

BACKGROUND

Conventionally, a personal computer (PC) or other such computer has been used to control devices such as printers and multifunction peripherals possessing a printer function, scanner function, and the like. In order to use these devices through a computer, it has been necessary first to install a driver on the computer for each type of device being controlled. After installing a driver on the computer, the user performs operations to store information in the computer regarding the device being controlled by the driver.

SUMMARY

However, when the device has a plurality of functions for executing a plurality of types of processes, it has been necessary for the user to store information on the device for each type of process performed thereby, resulting in complex user operations.

In view of the foregoing, it is an object of the present invention to provide a data-processing apparatus, data-processing program, and data-processing method capable of reducing the number of user operations required for storing information regarding device for each type of process performed by the device.

In order to attain the above and other objects, the invention provides a non-transitory computer-readable storage medium storing a set of instructions executed by a computer of a data processing apparatus. The data processing apparatus includes an operating unit, a storage unit, and a communication unit. The instructions cause the data processing apparatus to: receive, through the operating unit, a selection of one of a first function and a second function other than the first function; store, if one device is selected through the operating unit as a device for executing the one of the first function and the second function from among at least one device with which the communication unit is capable of communicating, the one device selected as the device for executing the one of the first function and the second function, the one device selected as the device for executing the one of the first function and the second function being stored in a manner such that: if another device has been stored in the storage unit in correlation with the one of the first function and the second function, the one device selected as the device for executing the one of the first function and the second function, in addition to the another device that has been stored in correlation with the one of the first function and the second function, is stored in correlation with the one of the first function and the second function; and if another device has been stored in the storage unit in correlation with another of the first function and the second function, the one device selected as the device for executing the one of the first function and the second function, in addition to the another device that has been stored in correlation with the another of the first function and the second function, is stored in correlation with the another of the first function and the second function; and control, in response to receipt of an instruction to execute the one of the first function and the second function through the operating unit, a device with which the communication unit is capable of communicating to execute the one of the first function and the second function in a manner such that: if no device is stored in correlation with the one of the first function and the second function when the selection of one of the first function and the second function is received through the operating unit, the one device selected as the device for executing the one of the first function and the second function executes the one of the first function and the second function; and if another device has been stored in correlation with the one of the first function and the second function when the selection of one of the first function and the second function is received through the operating unit, one of candidate devices executes the one of the first function and the second function, the candidate devices including at least the another device that has been stored in correlation with the one of the first function and the second function.

According to another aspect, the present invention provides a data processing apparatus including a storage unit, an operating unit, a communication unit, and a control device. The control device is configured to: receive, through the operating unit, a selection of one of a first function and a second function other than the first function; store, if one device is selected through the operating unit as a device for executing the one of the first function and the second function from among at least one device with which the communication unit is capable of communicating, the one device selected as the device for executing the one of the first function and the second function, the one device selected as the device for executing the one of the first function and the second function being stored in a manner such that: if another device has been stored in the storage unit in correlation with the one of the first function and the second function, the one device selected as the device for executing the one of the first function and the second function, in addition to the another device that has been stored in correlation with the one of the first function and the second function, is stored in correlation with the one of the first function and the second function; and if another device has been stored in the storage unit in correlation with another of the first function and the second function, the one device selected as the device for executing the one of the first function and the second function, in addition to the another device that has been stored in correlation with the another of the first function and the second function, is stored in correlation with the another of the first function and the second function; and control, in response to receipt of an instruction to execute the one of the first function and the second function through the operating unit, a device with which the communication unit is capable of communicating to execute the one of the first function and the second function in a manner such that: if no device is stored in correlation with the one of the first function and the second function when the selection of one of the first function and the second function is received through the operating unit, the one device selected as the device for executing the one of the first function and the second function executes the one of the first function and the second function; and if another device has been stored in correlation with the one of the first function and the second function when the selection of one of the first function and the second function is received through the operating unit, one of candidate devices executes the one of the first function and the second function, the candidate devices including at least the another device that has been stored in correlation with the one of the first function and the second function.

According to another aspect, the present invention provides a terminal device comprises the data processing apparatus described above.

BRIEF DESCRIPTION OF THE DRAWINGS

The particular features and advantages of the invention as well as other objects will become apparent from the following description taken in connection with the accompanying drawings, in which:

FIGS. 14, 15A, 16A, and 17A are flowcharts illustrating steps in a controlling process executed by the data processing apparatus according to the fourth embodiment;

FIG. 27 is a diagram illustrating the content of settings data stored in the data processing apparatus according to the sixth embodiment;

FIG. 28 is a flowchart illustrating steps in a default device reading process performed in S1803 of the controlling process shown in FIG. 26;

FIG. 29 is a flowchart illustrating steps in a settings data reading process performed in S1804 of the controlling process shown in FIG. 26;

DETAILED DESCRIPTION

Figure 1:
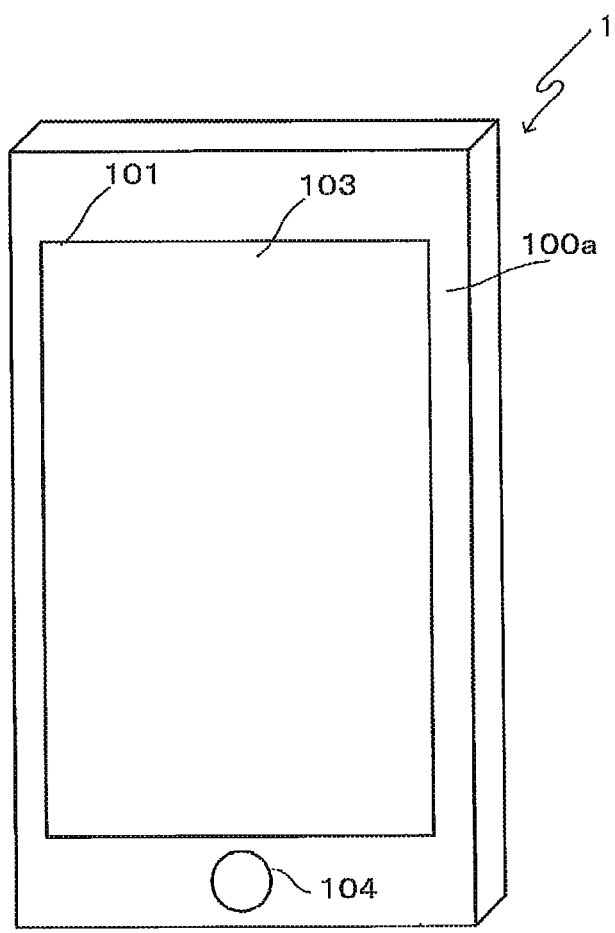
FIG. 1 is an overall diagram showing a data processing apparatus executing a set of instructions stored in a computer-readable storage medium according to first to sixth embodiments of the invention.

Next, a first embodiment of the present invention will be described while referring to FIGS. 1 through 6. FIG. 1 shows a portable data processing apparatus 1, such as a mobile phone or a portable terminal device. The data processing apparatus 1 has a relatively thin, or flattened, box-shaped case. One side surface of the case constitutes an operating surface 100a. The center region of the operating surface 100a constitutes a display area 101. A touch panel 103 is disposed over the display area 101, and an input interface 104 is disposed on the operating surface 100a below the display area 101.

(1) General Configuration of Data-Processing System

Figure 2:
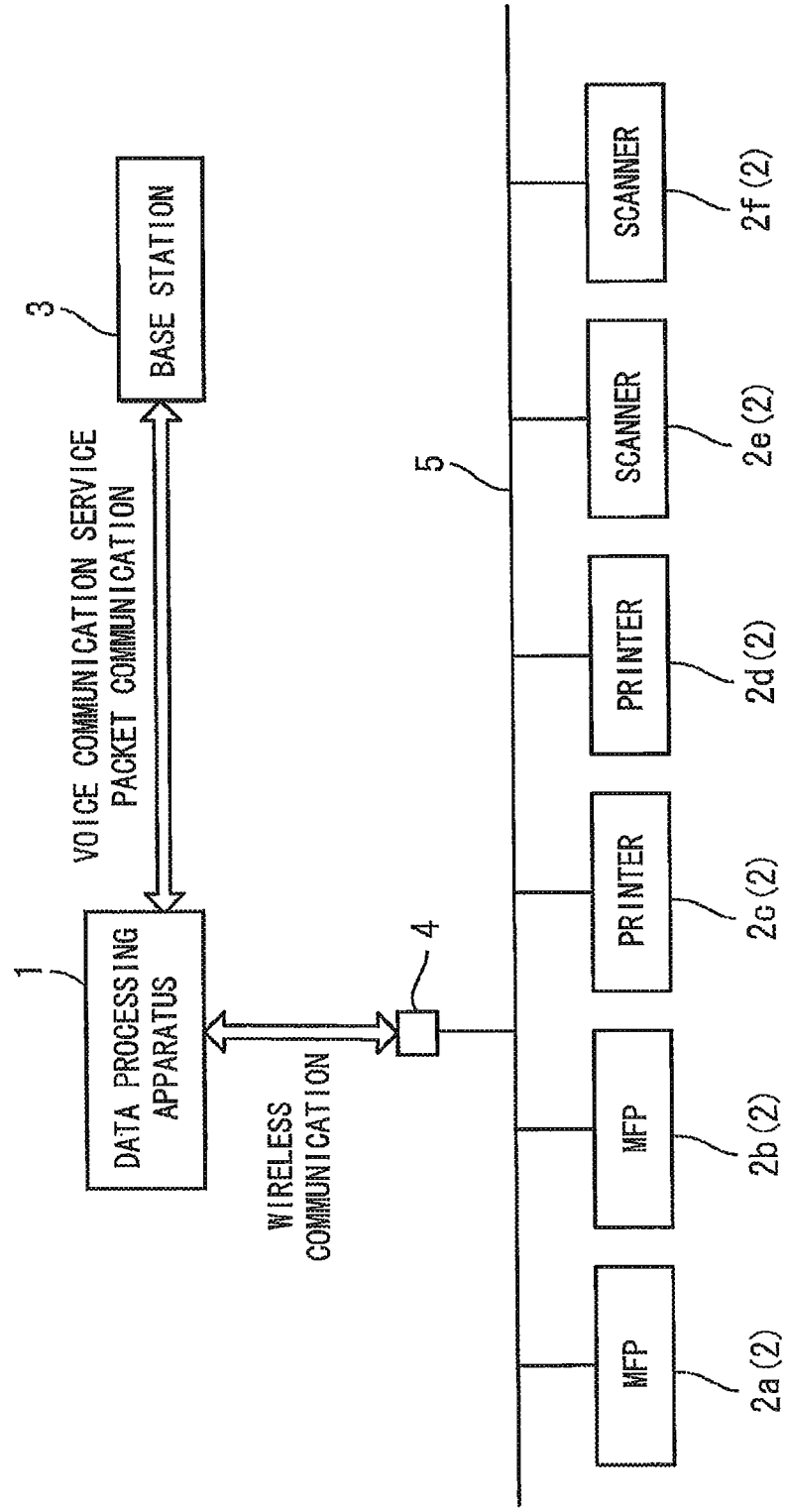
FIG. 2 is a block diagram conceptually illustrating the data processing device and devices connected to the data processing apparatus according to the first to sixth embodiments.

FIG. 2 is a block diagram conceptually illustrating the data processing apparatus 1, and various devices 2 connected to the data processing apparatus 1. The data processing apparatus 1 is capable of executing a device control program (a set of instructions causing the data processing apparatus 1 to provide functional units). The data processing apparatus 1 possesses both a telephone function and a wireless communication function and is wirelessly connected to a communication network 5 via an access point 4 or the like. The devices 2 are also connected to the communication network 5 and, hence, can connect to and communicate with the data processing apparatus 1.

The devices 2 connected to the communication network 5 include multifunction peripherals (MFPs) 2a and 2b, printers 2c and 2d, and scanners 2e and 2f. Of these, the MFP 2a, the printer 2c, and the scanners 2e and 2f are connected to the access point 4 via the communication network 5. By executing a print-and-scan application, the data processing apparatus 1 can transmit a print request to the MFP 2a and printer 2c via the access point 4, or a scan request to the MFP 2a and the scanners 2e and 2f. In other words, the data processing apparatus 1 is capable of using the MFP 2a, printer 2c, and scanners 2e and 2f via the access point 4. As will be described later, the data processing apparatus 1 is also capable of communicating with a base station 3.

Each of the MFPs 2a and 2b possesses a plurality of functions, and specifically a printer function, scanner function, and copier function. The MFPs 2a and 2b may be devices produced by different manufacturers or may be different models produced by the same manufacturer. The printers 2c and 2d and the scanners 2e and 2f are all standalone devices possessing only a printer function and scanner function, respectively. The devices in each pair may be produced by different manufacturers or may be different models produced by the same manufacturer. In the following description, simply "device 2" will be used to denote any one of these plurality of devices.

(2) Electrical Structure of the Data Processing Apparatus

Figure 3:
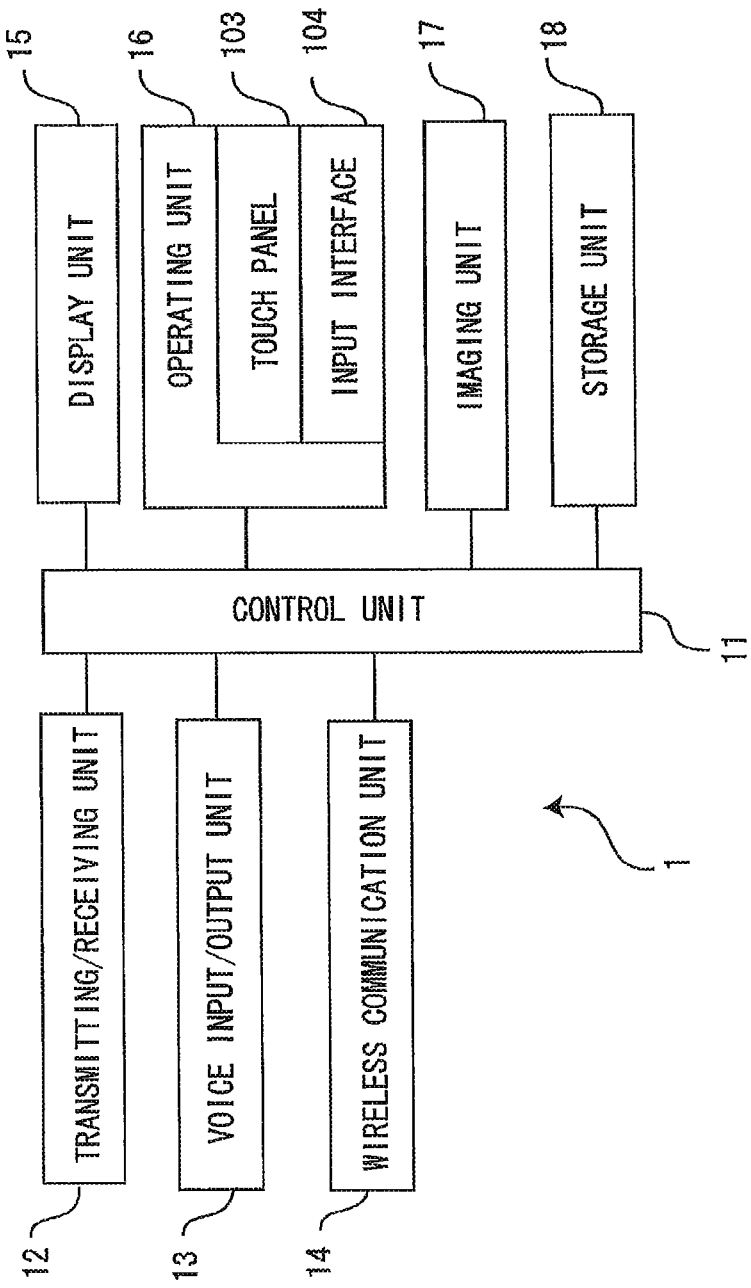
FIG. 3 is a block diagram showing electrical structure of the data processing apparatus according to the first to sixth embodiments.

FIG. 3 is a block diagram showing the overall electrical structure of the data processing apparatus 1. The data processing apparatus 1 includes a control unit 11, a transmitting/receiving unit 12, a voice input/output unit 13, a wireless communication unit 14, a display unit 15, an operating unit 16, an imaging unit 17, and a storage unit (memory) 18.

The control unit 11 is configured of an application processor, ROM, RAM, and the like. The application processor controls the components of the data processing apparatus 1 by executing various programs including the device control program stored in the ROM or the storage unit 18. In addition to storing various programs, the ROM stores data and the like required when the application processor executes the programs. The RAM is used by the application processor as the primary storage device when executing various processes.

The transmitting/receiving unit 12 is configured of an antenna, a radio frequency (RF) circuit, a baseband processor, and the like. The transmitting/receiving unit 12 exchanges audio signals with the base station 3 (FIG. 2) via the antenna. The transmitting/receiving unit 12 is also capable of performing packet-based communications with the base station 3.

The voice input/output unit 13 is configured of a microphone, speaker, voice-processing circuit, and the like. An audio signal inputted into the voice input/output unit 13 via the microphone is transmitted to the base station 3 by the transmitting/receiving unit 12, while an audio signal received by the transmitting/receiving unit 12 from the base station 3 is outputted as sound through the speaker.

The wireless communication unit 14 complies with Wi-Fi (registered trademark) technology (IEEE 802.11a/802.11b standards). The wireless communication unit 14 wirelessly connects to the communication network 5 via the access point 4 or the like, where the communication network 5 may be a local area network (LAN) or the Internet, for example.

The wireless communication unit 14 is not limited to Wi-Fi as its standard of wireless communications, provided that the data processing apparatus 1 can be connected wirelessly to the communication network 5. For example, the data processing apparatus 1 may be configured to connect wirelessly to the communication network 5 according to Bluetooth (registered trademark; IEEE 802.15.1) or infrared wireless optical data communications (IrDA). Further, while the data processing apparatus 1 is connected wirelessly to the communication network 5 in the first embodiment, the data processing apparatus 1 may also be connected to the communication network 5 by a cable.

The display unit 15 is configured of a display device, such as a liquid crystal display or an organic EL display, a drive circuit for driving the display device, and the like. The display unit 15 provides the display area 101 and functions to display images in the display area 101 based on image signals received from the control unit 11.

The operating unit 16 is configured of the generally transparent touch panel 103 that covers the display surface of the display device, a control circuit (not shown) for controlling the touch panel 103, and the input interface 104, which includes various operating buttons. By operating the operating unit 16, the user can input telephone numbers and perform various other operations in the application programs.

The touch panel 103 is formed of a transparent member disposed so as to cover the surface of the display area 101 (FIG. 1). In the first embodiment, the touch panel 103 uses a capacitive technology. Touching the touch panel 103 changes the electrostatic capacitance in the touched area. When the user touches the touch panel 103 with a finger or the like, the touch panel 103 inputs an electric signal into the control unit 11 corresponding to the region whose capacitance changed. Upon receiving this electric signal from the touch panel 103, the control unit 11 determines what region of the touch panel 103 was touched based on the signal. The input interface 104 activates the data processing apparatus 1 when pressed.

The imaging unit 17 includes an area image sensor, an optical system, an analog front-end unit, and an image processor. The imaging unit 17 captures and generates a digital image of a subject.

The storage unit 18 includes flash memory or other nonvolatile memory used to store various programs and data. Specifically, the storage unit 18 stores an operating system (OS), a device control program described later, various other application programs (hereinafter simply referred to as "applications"), image data, document data, and the like. As will be described later in greater detail, the storage unit 18 also stores identification data identifying the default device to be used for each function controlled by the device control program.

Applications such as the device control program can be downloaded from an external server via the transmitting/receiving unit 12 or wireless communication unit 14. The data processing apparatus 1 may also be provided with a USB interface and may download applications from an external computer via this USB interface.

(3) Device Control Program

The device control program is an application that can control a plurality of functions possessed by the devices 2 (specifically, a printer function and scanner function). The device control program functions as a device driver for implementing processes on the data processing apparatus 1, including a process for controlling a printer to print an image, and a process for controlling a scanner to acquire an image. The device control program also possesses a plurality of its own functions for implementing such processes on the data processing apparatus 1 as a process for organizing and managing a plurality of images in photo albums, a process to load images from the imaging unit 17, and a process to transfer images to an e-mail application.

The control unit 11 according to the device control program can control a plurality of types of devices 2. Thus, the user can select a device 2 from among one or more devices 2 connected to the communication network 5 for executing a printing or scanning operation. For example, if the user selects a printer (or an MFP possessing a printer function), the device control program records the selected printer in the storage unit 18. When the user issues a print command, the control unit 11 controls the printer registered in the storage unit 18 to print the target image according to the device control program.

Here, the process of "registering" a printer involves acquiring information for controlling the selected printer from the printer itself (device data) and writing the acquired device data in a prescribed memory area of the storage unit 18. The device data specifically includes a device name, location data indicating the location of the device on the communication network 5 (an IP address, domain name, or the like), and functional data indicating functions possessed by the device.

The functional data includes data indicating whether the device possesses a printer function, scanner function, facsimile function, or the like and more detailed data of each function, such as the paper sizes supported by the printer function and the availability of a color printing function, duplex printing function, and the like.

The process is similar for scanning an image. Specifically, the control unit 11 registers the user-selected scanner in the storage unit 18 and controls the registered scanner to acquire an image.

In this way, in accordance with the device control program, the control unit 11 can control both the printer function and scanner function of a device 2. However, since some of the devices 2 possess only one of the printer function and scanner function, it is desirable to register the devices 2 for each function.

(3-1) User Interface for the Device Control Program

Next, an example will be described for the user interface of the device control program according to the first embodiment when only one device for executing a printer function and one device for executing a scanner function can be registered on the data processing apparatus 1. When a device 2 has been registered on the data processing apparatus 1 for the printer function, the device control program controls this device when executing the printer function. Similarly, when a device 2 has been registered on the data processing apparatus 1 for the scanner function, the device control program controls this device when executing the scanner function.

Figure 4:
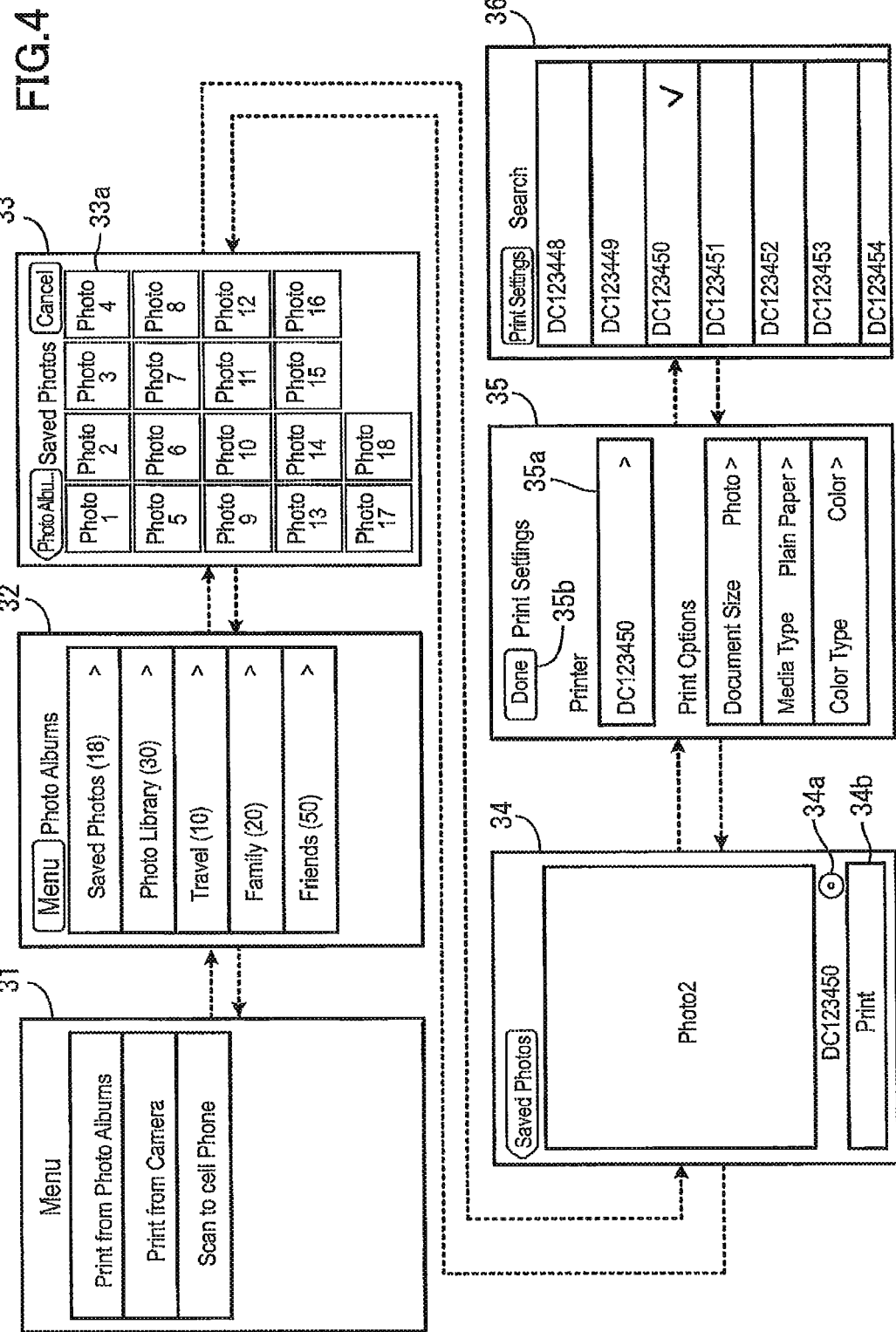
FIGS. 4 and 5 are explanatory diagrams illustrating the sequence of screens displayed on the data processing apparatus according to the first embodiment.
Figure 5:
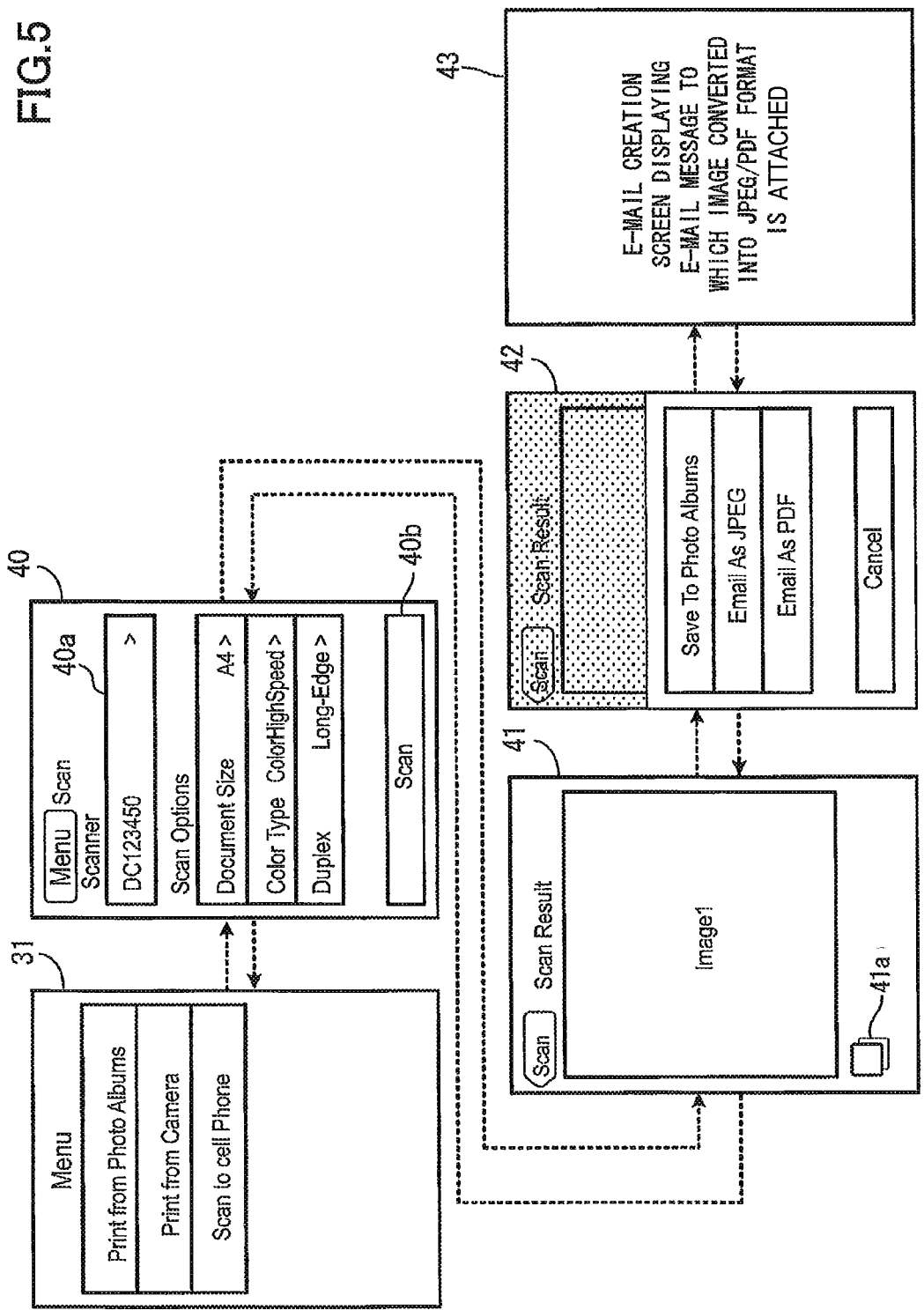

FIGS. 4 and 5 illustrate the sequence of screens displayed on the display unit 15 by the control unit 11 in accordance with the device control program according to the first embodiment. A screen 31 shown in FIG. 4 is a main menu. The main menu includes three options: "Print from Photo Albums" for printing images that are saved in albums, "Print from Camera" for capturing an image of a desired subject with the imaging unit 17 and directly printing the captured image, and "Scan to Cell Phone" for acquiring an image from the scanner. Each of these menu items displays a new menu when selected. The user can select and display the corresponding menu by touching the desired option in the screen 31.

A screen 32 is displayed when the user selects the "Print from Photo Albums" option in the main menu. As described above, the device control program can organize and manage images in photo albums. In the screen 32, the device control program displays a list of those albums. When the user selects one of the albums displayed in the screen 32, the display changes to a screen 33 in which all images included in the selected album are displayed as thumbnail images 33a (the reference number is noted for only one of the thumbnail images in FIG. 4).

When the user touches one of the thumbnail images 33a in the screen 33 to select the corresponding image, the display changes to a screen 34 in which the selected image is displayed. The screen 34 is also displayed after the user captures an image with the imaging unit 17 when the "Print from Camera" was selected in the main menu described above. In this case, the image captured by the imaging unit 17 is displayed in the screen 34.

The user can print the displayed image by touching a "Print" button 34b in the screen 34. Before printing the image, the user can display a screen 35 by touching a "Settings" button 34a in the screen 34. When the screen 35 is displayed, the user can register a printer or configure print options.

The device name of the currently registered printer ("DC123450" in this example) is displayed in the screen 34 to the left of the "Settings" button 34a. In other words, if one of the printers has already been registered when displaying the screen 34, the device control program displays the device name of the registered printer to the left of the "Settings" button 34a. If a printer has not yet been registered, a device name is not displayed in the screen 34. The printer for which the device name is displayed in the screen 34 may be a standalone printer possessing only a printer function or an MFP possessing a printer function.

When initially displayed, the screen 35 includes the device name of the registered printer and the default print options. A device name is not displayed when a printer has not yet been registered. If a printer has not yet been registered or if the user wishes to change the registered printer, the user touches a field 35a showing the device name in order to display a screen 36.

When the user touches the field 35a, the device control program searches for printers connected to the communication network 5 and displays a list of device names for the printers found in this search in the screen 36. The device control program can perform this search using a protocol designed to search for devices connected to the communication network 5, for example.

If the user selects one of the printers displayed in the screen 36, the control unit 11 executes, in accordance with the device control program, a printer registration process described later to register the selected printer on the data processing apparatus 1. While this will be described later in greater detail, if the printer selected by the user in the screen 36 is an MFP, the device control program registers this MFP as both the printer and the scanner in the printer registration process.

After completing the printer registration process, the device control program returns the display to the screen 35 and displays the device name of the newly registered printer in the field 35a.

The screen 35 also allows the user to configure print options. In this example, the print options include "Document Size" (Photo, Photo 2L, A4, Letter, etc.), "Media Type" (Plain Paper, Transparencies, etc.), and "Color Type" (Color, Grayscale, etc.). If the user selects "Document Size," for example, the device control program displays a screen (not shown) in which the user can select the paper size from among "Photo," "Photo 2L," "A4," "Letter," and the like.

After registering a printer and/or configuring the print options in the screen 35, the user touches a "Done" button 35b to return to the screen 34. When the user touches the "Print" button 34b in the screen 34, the device control program (control unit 11) controls the registered printer (i.e., the printer set as the device to be used when executing the printer function) to print the image ("Photo2" in this example) displayed in the screen 34. At this time, the device control program controls the registered printer based on the device data that was stored in the storage unit 18 and the print options that were set in the screen 35.

In the process for controlling the printer, the control unit 11 generates, in accordance with the device control program, a print command based on the image and the print options and outputs this print command to the printer. The device control program may also be configured to transmit the image and the print options to the printer so that the printer can generate print data.

FIG. 5 illustrates the sequence of screens displayed when the user has selected "Scan to Cell Phone" in the main menu of the screen 31. The device control program displays a screen 40 when the user selects "Scan to Cell Phone" in the main menu. The initial display of the screen 40 includes the device name of the registered scanner and default scan options. A device name is not displayed when a scanner has not yet been registered.

As described above, when the printer selected in the screen 36 is an MFP, the same MFP is registered as the scanner in the printer registration process. In this case, the device name of this MFP is displayed in a field 40a as the device name of the scanner, without the user having to perform an operation to register the scanner.

However, when a scanner has not yet been registered or when the user wishes to change the registered scanner, the user can select a scanner according to the same method described above for selecting a printer. Since the screen used to select a scanner has essentially the same configuration as the screen used for selecting a printer (the screen 36), a description of this screen will not be included here.

When the user selects an MFP as the scanner, this MFP is not registered as the printer when a device 2 has already been registered as the printer, as shown in the screen 35 (see FIG. 4), because the device control program of the first embodiment gives priority to a previously registered printer in order that the user does not unintentionally change the printer when selecting a scanner. However, the device control program may also be configured not to give priority to a previously registered printer and to register the MFP selected as the scanner as both the scanner and printer.

The user can also configure scan options in the screen 40. In this example, the scan options include "Document Size" (Photo, Photo 2L, A4, Letter, etc.), "Color Type" (Color High-Speed, Grayscale High-Speed, Color Low-Speed, Grayscale Low-Speed, etc.), and "Duplex" (Long-Edge, Short-Edge, etc.).

After registering a scanner, configuring the scan options, and setting the original to be scanned in the scanner, the user touches a "Scan" button 40b. When the user touches the "Scan" button 40b, the device control program controls the registered scanner (i.e., the scanner set as the device to be used when executing the scanner function) to read images on the original. The device control program performs this control process based on the device data that was written in the storage unit 18 and the scan options that were configured in the screen 40. The process for controlling the scanner involves outputting a command for setting the speed and resolution for scanning the original based on the scan options to the scanner to control the scanner to scan the original.

After the scan is completed, the device control program switches the display to a screen 41 in which an image representing the scanned original ("Image1" in this example) is displayed. If the user touches an "Action" button 41a in the screen 41, the display changes to a screen 42.

The screen 42 includes a menu with the options "Save to Photo Albums," "E-mail as JPEG," and "E-mail as PDF." If the user selects either "E-mail as JPEG" or "E-mail as PDF," the device control program displays an E-mail Creation screen 43 displaying an e-mail message to which the image, converted into the JPEG format or PDF, is attached. The E-mail Creation screen 43 is displayed by a separate application from the device control program.

However, if the user selects "Save to Photo Albums," the device control program displays a screen (not shown) for selecting a destination album to which the image will be saved. When the user selects a desired album, the device control program saves the image in the selected album and returns the display to the screen 41.

(3-2) Printer Registration Process

Next, the printer registration process mentioned above will be described, including the process for searching for printers connected to the communication network 5.

Figure 6:
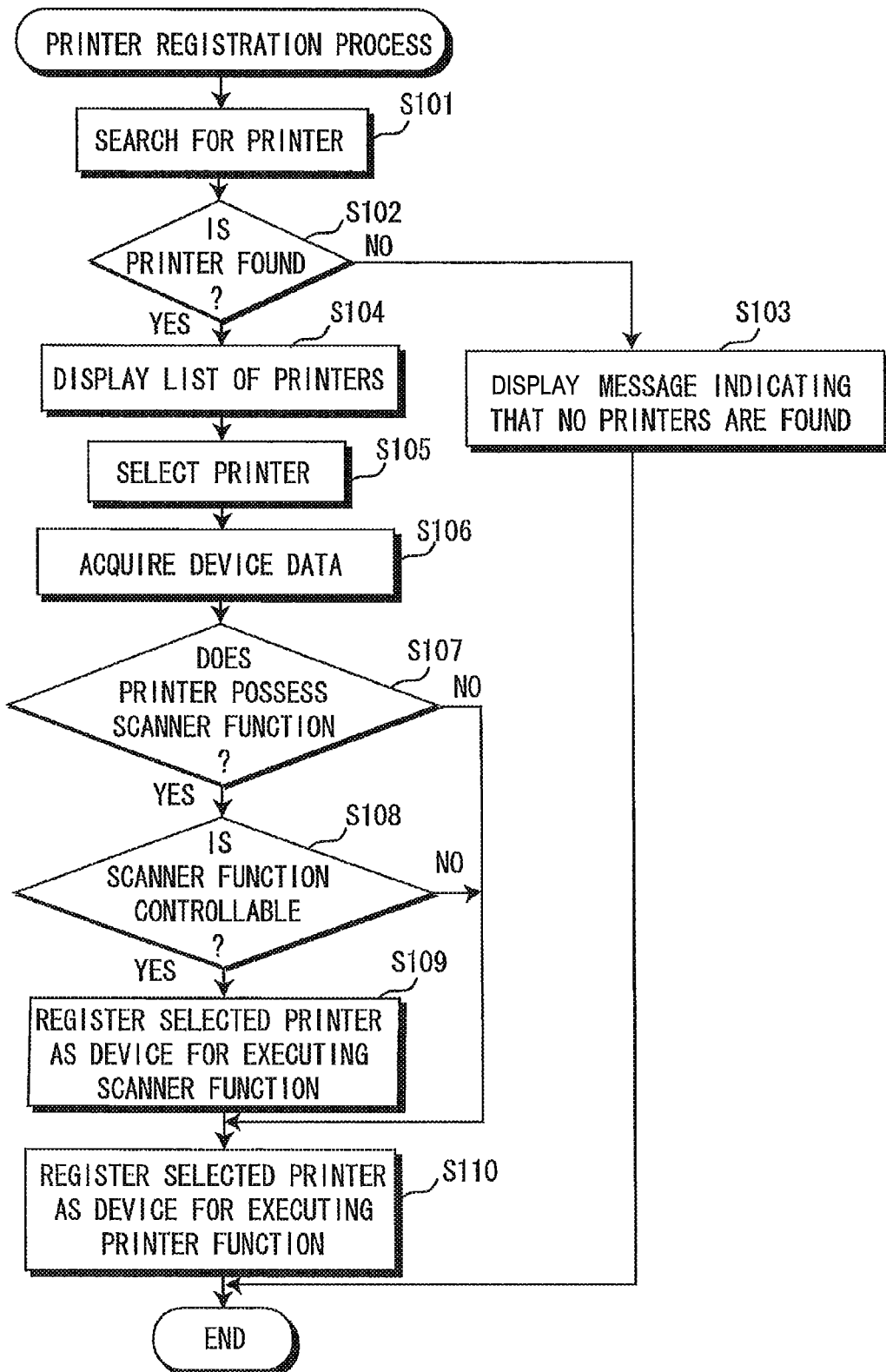
FIG. 6 is a flowchart illustrating steps in a printer registration process executed by the data processing apparatus according to the first embodiment.

FIG. 6 is a flowchart illustrating steps in the printer registration process executed by the data processing apparatus of the first embodiment in accordance with the device control program. The control unit 11 begins the printer registration process when the user touches the field 35a in the screen 35, as described above.

In S101 the control unit 11 searches for printers (candidate device) connected to the communication network 5. The control unit 11 searches for printers by broadcasting data on the communication network 5 requesting device data for devices 2 connected to the communication network 5 and subsequently receives this device data in response. The control unit 11 stores the received device data in RAM.

A list of device names for devices provided with a controllable printer function is hardcoded in the source code of the device control program. Thus, if the device name in the device data acquired above is not included in the hardcoded list, the control unit 11 determines that the device is a non-controllable printer and deletes the device data for this device from RAM. Accordingly, the remaining device data stored in RAM denotes printers that the device control program can control. The list may be updated via the communication network 5 as new controllable devices emerge.

In S102 the control unit 11 determines whether or not at least one printer has been found (whether device data for one or more devices is stored in RAM). The device control program advances to S103 if no printers were found on the communication network 5 and advances to S104 if one or more printers were found.

In S103 the control unit 11 displays a message on the display unit 15 indicating that no printers were found and subsequently ends the printer registration process.

In S104 the control unit 11 displays a list of device names for printers found in S101 in the screen 36 based on the device data stored in RAM. In S105 the control unit 11 waits until the user has selected one of the printers. Here, "select" may be rephrased as "designate," or "determine," when the device name for only one printer is displayed.

In S106 the control unit 11 acquires device data for the printer selected by the user in S105 from the data that was stored in RAM in S101. In S107 the control unit 11 determines whether the selected printer possesses a scanner function (i.e., whether the device is a MFP) based on this device data. The control unit 11 advances to S108 when the selected printer possesses a scanner function and skips S108 and S109 and advances directly to S110 when the printer does not possess a scanner function.

In S108 the control unit 11 determines whether the scanner function possessed by the selected printer (the MFP in this case) is controllable. For example, a list of device names for devices that possess controllable scanner functions can be hardcoded in the source code of the device control program. Thus, the control unit 11 determines that the scanner is controllable when the device name included in the device data acquired in S106 is in the list and not controllable when the device name is not in the list.

This determination is necessary because, even though the device 2 possesses a scanner function, the device control program may be unable to control this scanner function since different models of a device may require different control commands, for example. The device control program advances to S109 when determining that the scanner function is controllable and skips to S110 when the function is noncontrollable.

In S109 the control unit 11 registers the selected printer (an MFP in this case) in the data processing apparatus 1 as the device for executing the scanner function. Next, the control unit 11 sets the registered printer as the device to be used for executing the scanner function. If the touch panel 103 accepts the instruction to perform the scanner function from a user, the control unit 11 controls the device to perform the scanner function.

In S110 the control unit 11 registers the selected printer (a standalone printer or MFP) as the device for executing the printer function. Next, the control unit 11 sets this registered printer as the device to be used for executing the printer function. If the touch panel 103 accepts the instruction to perform the print function from the user, the control unit 11 controls the device to perform the printer function.

(4) Effects of the First Embodiment

In the first embodiment of the present invention described above, when the user selects a printer, the control unit 11 according to the device control program registers this printer not only as the printer for executing the printer function, but also as the scanner for executing the scanner function when the printer possesses a scanner function (i.e., when the printer is an MFP). When the control unit 11 registers a device possessing both a printer function and a scanner function separately for each function, the user need only select the device once. Accordingly, the data processing apparatus 1 according to the device control program of the first embodiment reduces the operational load on the user by not requiring the user to select a device for each function.

If a device is an MFP, for example, the user may wish to use this MFP both as the printer and as the scanner. As an example, there may be times when the user would like to print an image on the printer, handwrite something on the printed sheet, and then scan the sheet with the scanner. With the device control program of the first embodiment, the user can register this MFP for each of a plurality of functions simply by selecting the MFP once. As a result, the user can immediately use each of the plurality of functions possessed by the MFP.

Further, the data processing apparatus 1 according to the first embodiment registers the printer as the scanner as well, but only when the printer possesses a scanner function. Even though the device control program may be able to control a plurality of types of printers, all of these printers do not necessarily possess a scanner function. In the example of the first embodiment, printers 2c and 2d are standalone printers and do not possess a scanner function. Since the device control program according to the first embodiment registers a printer as the scanner only when the printer possesses a scanner function, it is less likely that a selected printer will be registered as the scanner when the printer does not possess a scanner function.

When the selected printer possesses a scanner function but the device control program is unable to control the scanner function of the selected printer, the device control program does not register the selected printer as the device for executing the scanner function, thereby reducing the likelihood of the device control program not being able to control a registered device in the control process.

Next, a second embodiment of the present invention will be described with reference to FIGS. 7 through 9. While the data processing apparatus 1 according to the first embodiment described above can register only one printer and one scanner, the data processing apparatus 1 according to the second embodiment can register a plurality of printers and scanners. In the second embodiment, the device control program sets one of the registered printers exclusively as the "default printer" (device to be used when executing the printer function) and controls the printer set as the default printer to print images. The device control program performs the same process for the scanner.

Figure 7:
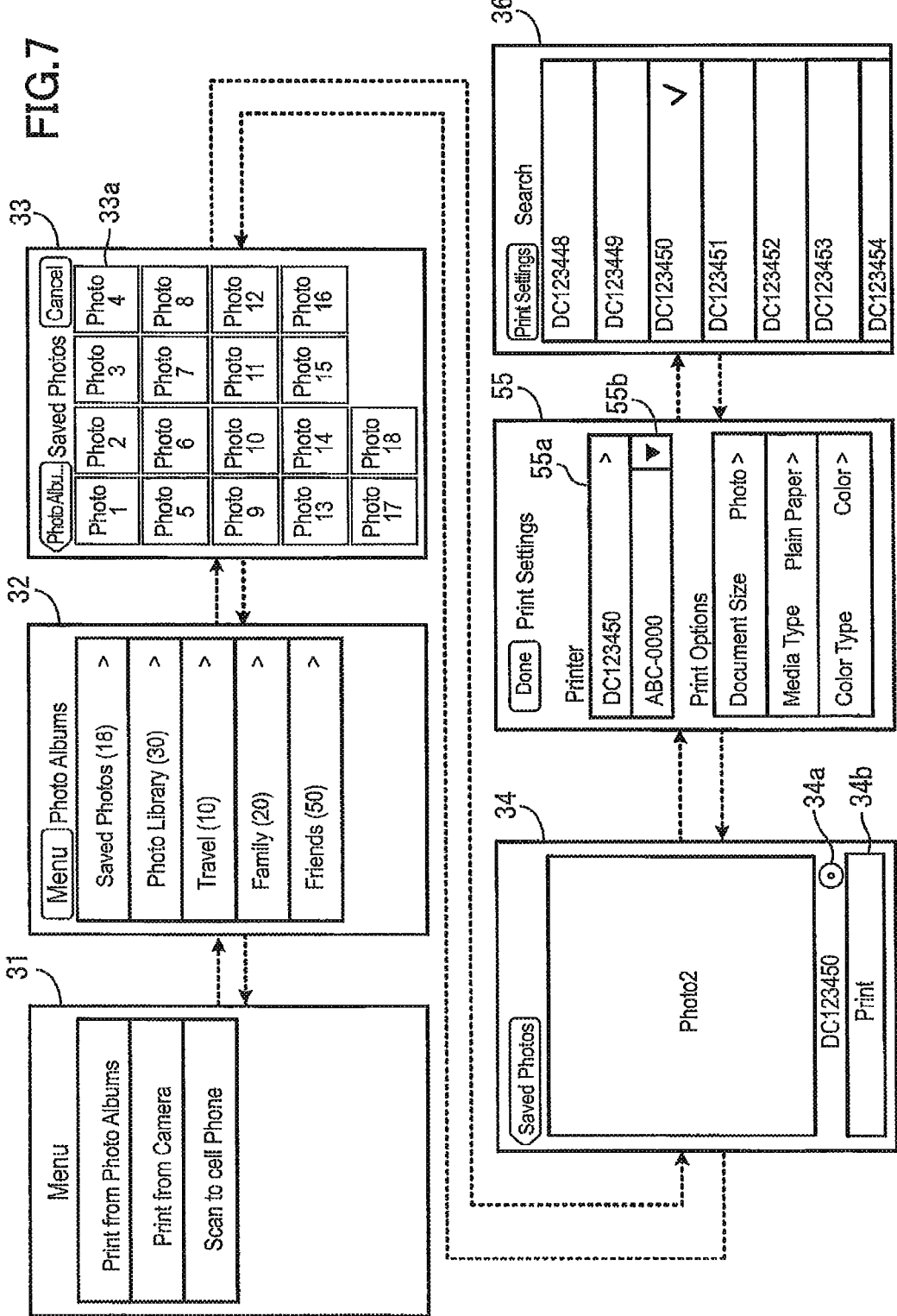
FIGS. 7 and 8 are explanatory diagrams illustrating the sequence of screens displayed on a data processing apparatus according to a second embodiment of the invention.

FIG. 7 shows the sequence of screens displayed on the display unit 15 when the user has selected "Print from Photo Albums" in the second embodiment. A screen 55 in the second embodiment, which corresponds to the screen 35 in the first embodiment, includes a field 55a for displaying a device name. The device name displayed in the field 55a is not simply the name of a registered printer, but is the device name of a registered printer set as the default printer. As described above, the device control program controls the printer set as the default printer to print images.

The screen 55 also includes a pull-down menu 55b for selecting the default printer. When the user touches the pull-down menu 55b, a list of device names for registered printers is displayed. By selecting the device name for a printer displayed in this list, the user can exclusively set this printer as the default printer. Since this setting is exclusive, the default printer setting is canceled for the printer that was previously set as the default printer.

Figure 8:
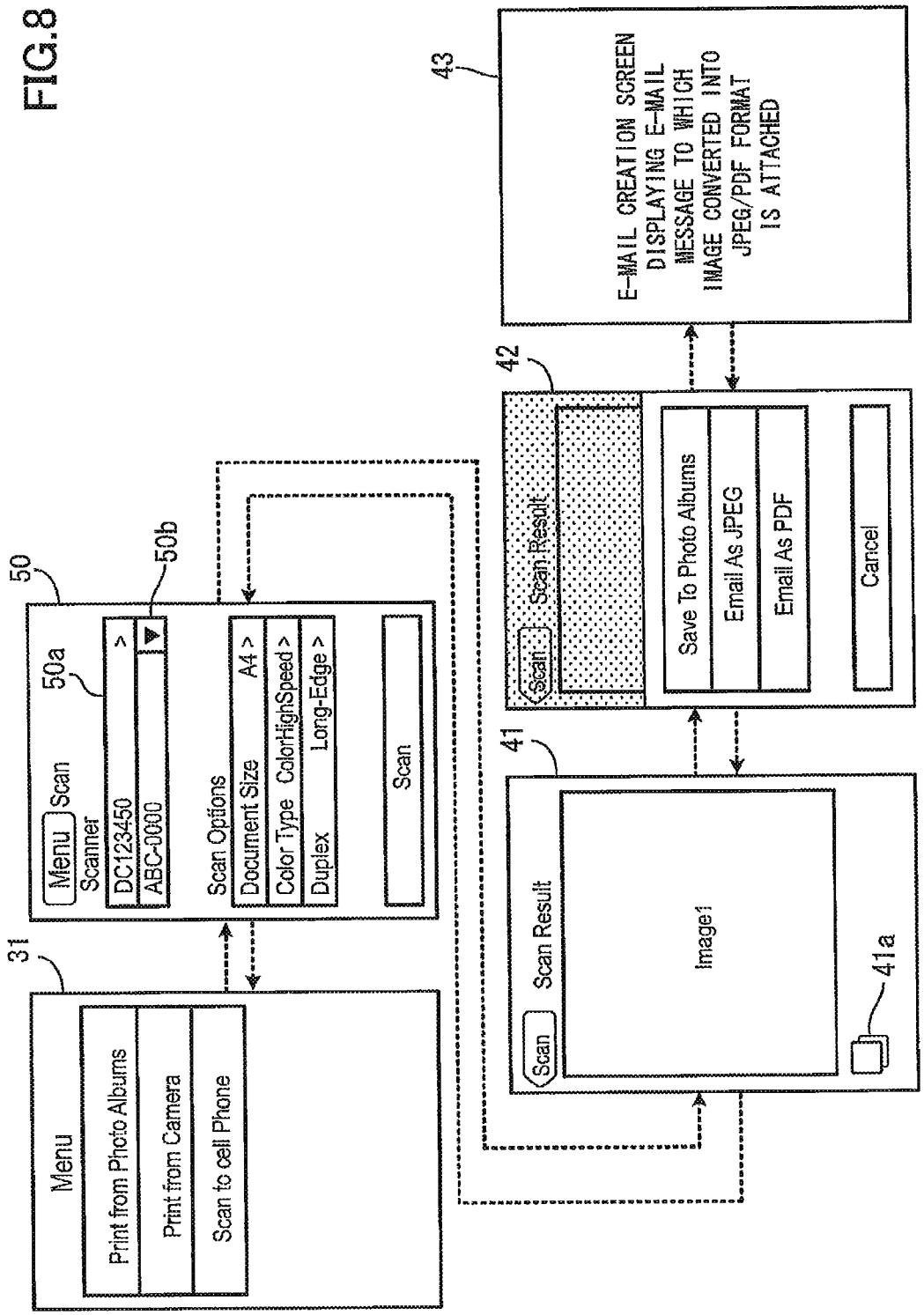

FIG. 8 shows the sequence of screens displayed when the user selects "Scan to Cell Phone" in the second embodiment. A screen 50 in the second embodiment, which corresponds to the screen 40 in the first embodiment, has a field 50a for displaying a device name. The device name displayed in the field 50a is not simply the device name of a registered scanner, but is also the device name of a registered scanner that has been set as the default scanner. As described above, the device control program controls the scanner set as the default scanner to read originals.

The screen 50 also includes a pull-down menu 50b for selecting the default scanner. When the user touches the pull-down menu 50b, the device control program displays a list of device names for the registered scanners. By selecting one of the device names for a scanner displayed in the list, the user can exclusively set this scanner as the default scanner. Since the setting is exclusive, the default scanner setting for another scanner that had been set previously is canceled.

If the user selects the device name "ABC-0000" for an MFP in the screen 36 of FIG. 7 (not shown) during the printer registration process according to the second embodiment while "DC123450" for an MFP is currently set as the default scanner, then the device control program registers the MFP "ABC-0000" as a scanner, but does not set this scanner as the default scanner. In this example, the device control program displays the MFP "DC123450" in the field 50a of the screen 50 and displays the MFP "ABC-0000" in the pull-down menu 50b, as illustrated in FIG. 8.

Figure 9:
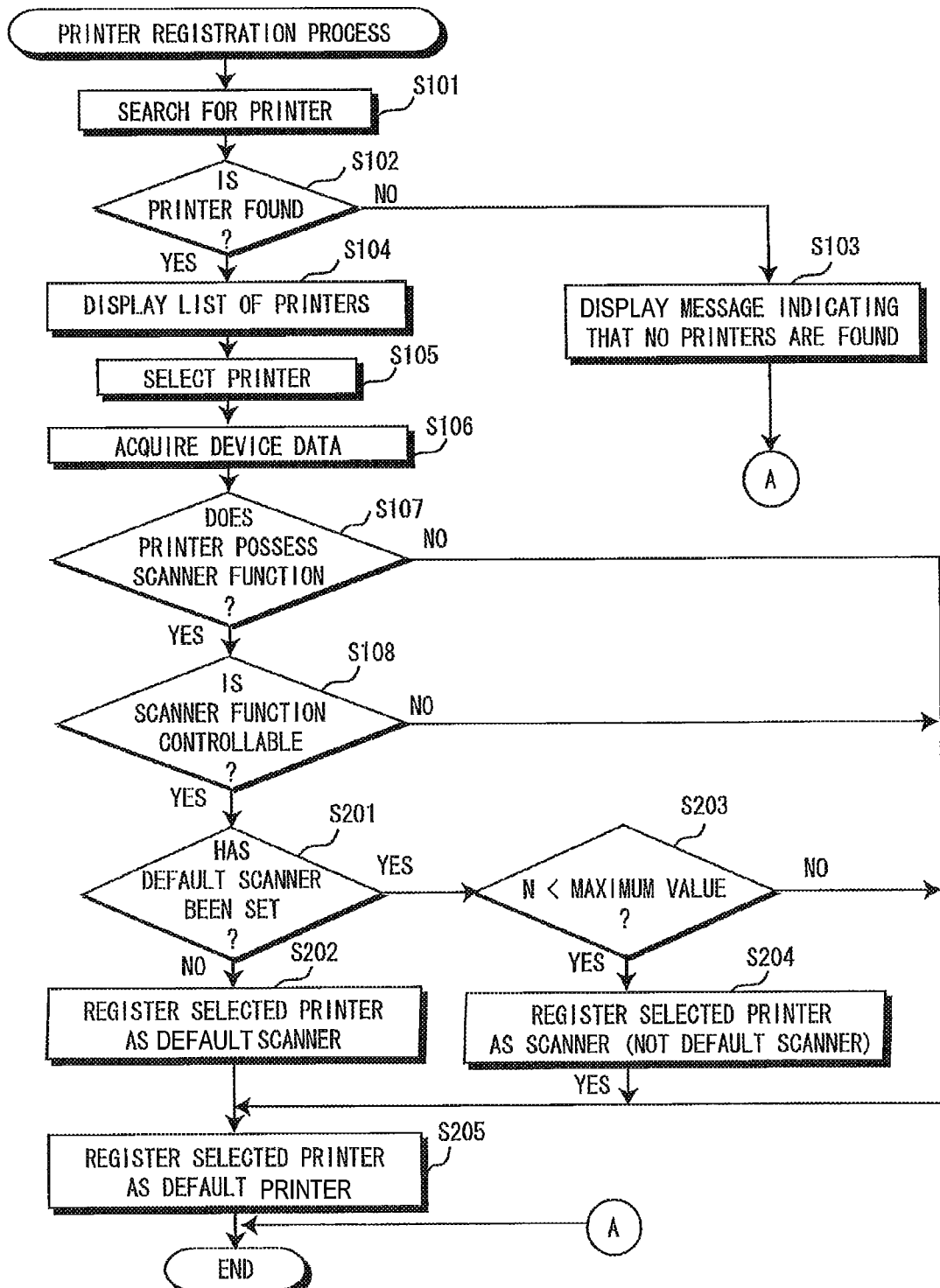
FIG. 9 is a flowchart illustrating steps in a printer registration process executed by the data processing apparatus according to the second embodiment.

FIG. 9 is a flowchart illustrating steps in the printer registration process according to the second embodiment, wherein steps essentially identical to those described in the first embodiment are designated with the same step numbers to avoid duplicating description.

In S201 of the process in FIG. 9, the control unit 11 according to the device control program determines whether a scanner (or MFP) other than the MFP selected in S105 has been set as the default scanner. The control unit 11 advances to S202 when another scanner has not been set as the default (S201: NO) and advances to S203 when another scanner has been set as the default (S201: YES).

In S202 the control unit 11 registers the selected printer (MFP 2a or 2b in this case) as a device for executing the scanner function and exclusively sets this printer (MFP 2a or 2b in this case) as the default scanner.

In S203 the control unit 11 determines whether the number n of registered scanners is less than the maximum number N that can be registered. The control unit 11 advances to S204 when the number n is less than the maximum number N (S203: YES). In S204 the control unit 11 registers the selected printer (MFP in this case) as a device for executing the scanner function. Here, the printer (MFP) is not set as the default scanner. Hence, the scanner previously set as the default scanner remains the default scanner.

On the other hand, if the control unit 11 determines in S203 that the number n of registered scanners has reached the maximum number N that can be registered (S203: NO), the control unit 11 does not register this printer as a scanner in S204, but skips directly to S205. In S205 the control unit 11 registers the selected printer (a standalone printer 2c, 2d or MFP 2a, 2b) as a device for executing the printer function and sets this device as the default printer.

According to the second embodiment described above, when registering a new device as a device to be used for executing the scanner function, the control unit 11 does not set this new device to be used as the default device for executing the scanner function when a default device for the scanner function has already been set. Accordingly, the user can continue to use the device previously set as the default device for executing the scanner function after registering a new device.

The user can also execute the scanner function on a newly registered device by selecting this device in the screen 50 as the default device for executing the scanner function.

While the device control program is capable of registering a plurality of printers in the second embodiment, the device control program may instead be configured to register only one printer. In this case, the process of S110 described in the first embodiment should be executed in place of the process described in S205 of the second embodiment.

Next, a third embodiment of the present invention will be described with reference to FIG. 10. The third embodiment is a variation of the second embodiment. That is, when a selected printer possesses a scanner function and the user registers this printer (i.e., MFP) as a scanner, the newly registered scanner is set exclusively as the default scanner, even when another scanner is currently set as the default scanner.

Figure 10:
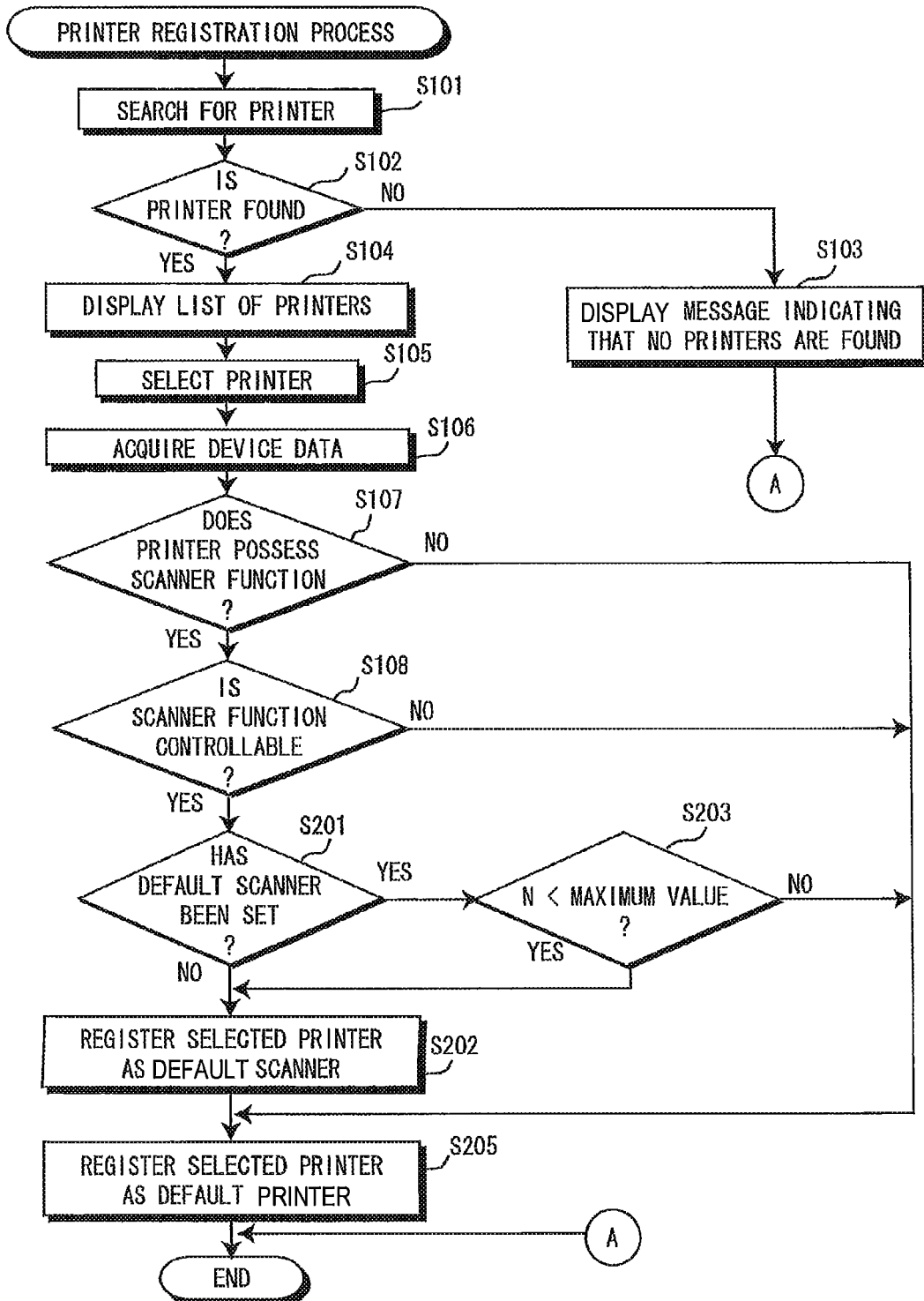
FIG. 10 is a flowchart illustrating steps in a printer registration process executed by a data processing apparatus according to a third embodiment of the invention.

FIG. 10 is a flowchart illustrating steps in the printer registration process according to the third embodiment. The printer registration process according to the third embodiment differs from the second embodiment only in that the device control program advances to S202 upon reaching a positive determination in S203. By advancing to S202 in this case, the device control program sets the printer (i.e., MFP) that was selected in S105 as the default scanner, even if another scanner is currently set as the default scanner. The remainder of the printer registration process according to the third embodiment is essentially the same as the process described in the second embodiment.

According to the third embodiment of the present invention described above, the device control program sets a newly registered device as the default device for executing the scanner function. When a plurality of devices can be registered as a device for executing the scanner function, there is a high likelihood that a newly registered device is the device that the user will wish to use.

By setting a newly registered device as the default device for executing the scanner function, the control unit 11 according to the third embodiment can set a device having a high probability of being the device that the user wishes to use as the default device for executing the scanner function, thereby reducing the operational load on the user for setting the default device for executing the scanner function when a plurality of devices can be registered for executing the scanner function.

Default Devices Changing Process

Next, a changing process for changing the default device will be described with reference to FIG. 11. In the second and third embodiments described above, the user can change the default printer to any one of the registered printers and can change the default scanner to any one of the registered scanners.

When the user changes the default printer and the new default printer possesses a scanner function, the device control program sets this printer (i.e., MFP) as the default scanner. More specifically, when the user has changed the default printer, the control unit 11 determines whether the new default printer is also registered as a scanner (whether there exists a device name in the device data for devices registered for executing the scanner function that matches the device name of the new default printer). When the device name of the new default printer is registered as a scanner, the control unit 11 also sets this printer (i.e., MFP) as the default scanner.

Figure 11:
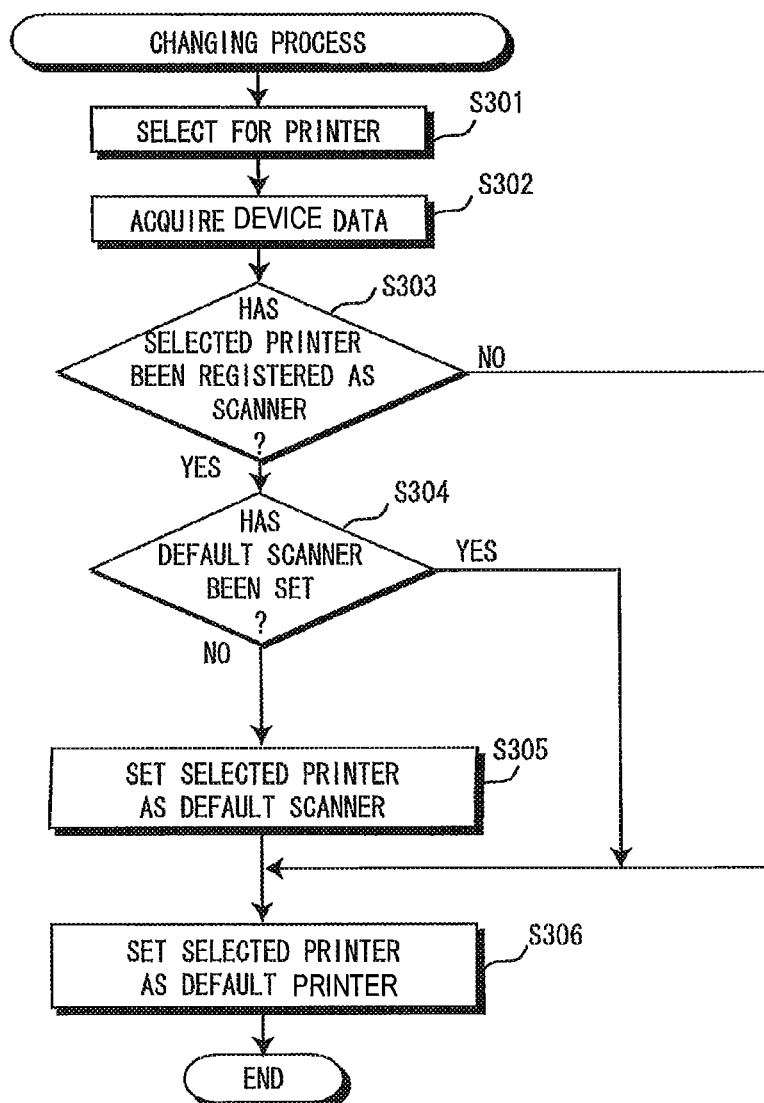
FIG. 11 is a flowchart illustrating steps in a changing process executed by the data processing apparatus according to the first, second, and third embodiments.

FIG. 11 is a flowchart illustrating a process for changing the default device. The control unit 11 begins this process when the user touches the pull-down menu 55b in the screen 55 (FIG. 7) in accordance with the device control program.

In S301 of the process in FIG. 11, the control unit 11 displays a list of the device names for registered printers in a pull-down menu and waits until the user selects one of the printers from the pull-down menu 55b. In S302 the control unit 11 acquires device data from the storage unit 18 for the selected printer. As described above, the device data for all registered printers and scanners is stored in the storage unit 18.

In S303 the control unit 11 determines whether the device data acquired in S302 was stored in the storage unit 18 as device data of a device for executing the scanner function. In other words, the control unit 11 determines whether the printer selected in S301 was registered as a scanner. The control unit 11 advances to S304 when the selected printer was registered as a scanner and advances to S306 when not registered as a scanner.

In S304 the control unit 11 determines whether another scanner is currently set as the default scanner. The control unit 11 advances to S306 if another scanner is currently set as the default scanner and advances to S305 if another scanner is not set as the default scanner.

In S305 the control unit 11 exclusively sets the printer (i.e., MFP) selected in S301 as the default scanner. In S306 the control unit 11 exclusively sets the printer (i.e., stand-alone printer or MFP) selected in S301 as the default printer. Subsequently, the process for changing default devices ends.

In the changing process, the control unit 11 does not set the printer (i.e., MFP) selected in S301 as the default scanner when another scanner is currently set as the default scanner. However, the control unit 11 may be configured to set the printer (i.e., MFP) selected in S301 as the default scanner. In this case, it is possible to eliminate the determination in S304 of FIG. 11.

According to the process for changing default devices described above, the control unit 11 sets the printer selected in the screen 55 not only as the device to be used by default for executing the printer function, but also as the device to be used by default for executing the scanner function.

If the device selected by the user from among one or more devices registered for one function is set as the device to be used by default for executing that function, it is highly likely that the user will wish to utilize other functions on this device. For example, when a user installs a new device and registers this device to be used for executing one function, it is easy to imagine that the user will wish to use the same device for other functions.

Further, if the user changes working locations, for example, the user may establish an MFP at the new location as the default printer. In most cases, the user will also set this MFP as the default scanner in order to scan images at the new location. In other words, when the user changes the default printer on a portable terminal device such as the data processing apparatus 1, it is very likely that the user will set this printer (i.e., MFP) as the default scanner.

When the user changes the default printer (device to be used for executing the printer function) and this new printer possesses a scanner function, the device control program can automatically set this printer as the default scanner since it is highly likely that the user will wish to set the printer (i.e., MFP) as the default scanner (device to be used for executing the scanner function). Accordingly, the device control program can reduce the operational load on the user for setting the printer as the default scanner.

While the invention has been described in detail with reference to first through third embodiments thereof, it would be apparent to those skilled in the art that many modifications and variations may be made therein without departing from the spirit of the invention, the scope of which is defined by the attached claims.

While the first through third embodiments describe the printer function and scanner function as examples of the plurality of functions, the functions are not limited to those in the preferred embodiments described above. For example, a facsimile function may be one of the functions.

While the first through third embodiments give an example of cases in which the device control program can control a plurality of types of devices, the device control program may be configured to control only one specific model of an MFP. When an MFP has been selected from among one or more models, the device control program may register this MFP as the device for executing the printer function and as the device for executing the scanner function. Since the model is identified in this case, the device control program should already know whether the MFP possesses both a printer function and a scanner function. Accordingly, the device control program may perform registration without determining whether the MFP possesses a printer function and a scanner function or without determining whether the device control program itself can control these functions.

While the first through third embodiments describe examples for selecting a printer after first selecting an image, the main menu may also be provided with such options as "Select Printer" and "Set Default Printer," for example.

In the first through third embodiments described above, the device control program registers a printer selected from among printers found on the network as a scanner when the printer possesses a scanner function (i.e., when the printer is an MFP). However, the device control program may also be configured to register a scanner selected from among scanners found on the network as a printer when the scanner possesses a printer function (i.e., when the scanner is an MFP).

Figure 12:
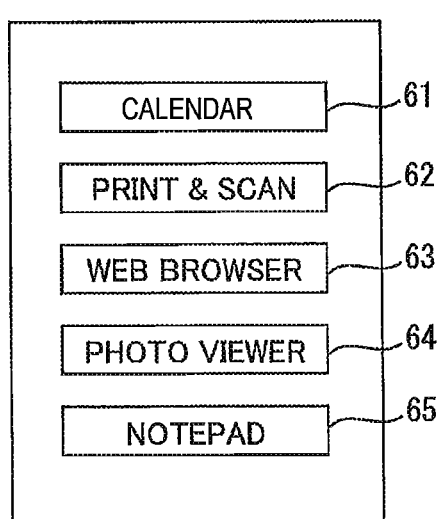
FIG. 12 is a diagram showing application icons displayed on a data processing apparatus according to a fourth embodiment of the invention.

Next, a fourth embodiment of the present invention will be described with reference to FIGS. 12 through 23. Icons for applications stored in the storage unit 18 are displayed in the display area 101. FIG. 12 shows an example of application icons 61-65 displayed in the display area 101. In this example, icons 61-65 are displayed for a calendar application, a print-and-scan application, a Web browser application, a photo viewer application, and a notepad application. When the user touches a region in which the icon of a desired application is displayed, the control unit 11 launches the corresponding application.

Figure 13:
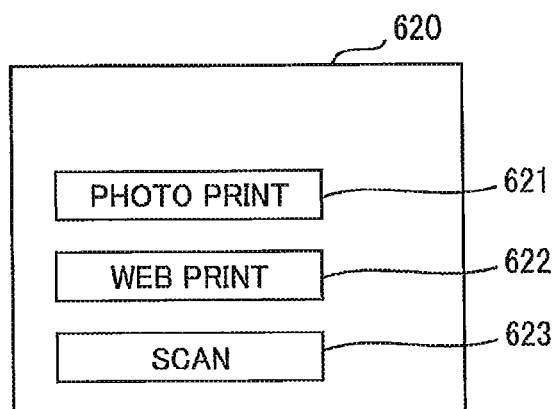
FIG. 13 is a diagram showing a function selection window displayed on the data processing apparatus according to the fourth embodiment.

FIG. 13 shows a Function Selection window 620 that is displayed in the display area 101 after the print-and-scan application is launched. A function describes one use of a device. Hence, the user selects a desired function of the device in the Function Selection window 620. When the control unit 11 receives an electric signal from the touch panel 103 corresponding to a region in which a function icon is displayed, the control unit 11 determines that the user has selected the function represented by the icon corresponding to the inputted electric signal. If the control unit 11 receives an electric signal corresponding to the region in which the "Photo print" icon 621 is displayed, the data processing apparatus 1 executes a process hereinafter referred to as a photo print process to transmit a print request for printing JPEG, bitmap, GIF, or other image data to a device having a print function, directing the device to perform a printing operation. When the control unit 11 receives an electric signal corresponding to the region in which the "Web print" icon 622 is displayed, the data processing apparatus 1 performs a process hereinafter referred to as a Web page print process for transmitting a print request for printing a Web page to a device having a print function, directing the device to perform a printing operation. When the control unit 11 receives an electric signal corresponding to the region in which the "Scan" icon 623 is displayed, the data processing apparatus 1 performs a process hereinafter referred to as a scan process for transmitting a scan request to a device having a scan function, directing the device to perform a scanning operation.

Next, a control process for controlling various components of the data processing apparatus 1 executed by the control unit 11 according to the print-and-scan application will be described with reference to FIGS. 14 through 23. In S601 of FIG. 14, the control unit 11 determines the application selected by the user from among photo print, Web print, and scan based on the electric signal received from the touch panel 103. The control unit 11 proceeds to branch "1" when photo print was selected (S601: photo print), branch "2" when Web print was selected (S601: Web print), and branch "3" when scan was selected (S601: scan).

The process performed when proceeding to branch "1" will be described with reference to the flowchart in FIG. 15A. In S701 of FIG. 15A the control unit 11 displays a list of thumbnails in the display area 101 for image data stored in the storage unit 18. When it is not possible to display all of the thumbnails in the display area 101 at one time, the display may be configured so that the user can view all thumbnails by scrolling.

In S702 the control unit 11 determines whether a selection for image data was inputted while the thumbnails for image data are displayed in the display area 101. That is, the control unit 11 determines whether or not an electric signal corresponding to the region of the touch panel 103 in which a thumbnail is displayed was inputted from the touch panel 103. When an electric signal corresponding to such a region has been inputted, the control unit 11 determines that a selection was inputted for image data corresponding to the thumbnail displayed in the region corresponding to the electric signal. The control unit 11 continues to loop back to S702 and repeat the determination while determining that an image data selection has not been inputted (S702: NO). Once the control unit 11 determines that an image data selection was inputted (S702: YES), the control unit 11 advances to S703.

In S703 the control unit 11 determines whether identification data is stored in the storage unit 18 identifying the default device for printing photographs. The photo print default device is preset in order to reduce the number of operations a user must perform to select a device when issuing a print request for a photo print process. When transmitting a photo print request to a device, the data processing apparatus 1 transmits a packet that includes the IP address of the device as the destination address and the IP address of the data processing apparatus 1 as the source address. Next, the control unit 11 associates the IP address of the destination device with the model number of this device and stores this association in a memory area A of the storage unit 18 that serves to store identification data for the photo print default device. That is, the control unit 11 registers the device as the photo default device by storing the identification data for the device in correlation with a photo print process. In other words, if a photo print request was previously transmitted to a device, the IP address of the device is stored in the memory area A of the storage unit 18. However, if the data processing apparatus 1 has not yet performed a photo print process, an IP address for a device used to perform a photo print is not yet stored in the memory area A of the storage unit 18. The control unit 11 determines whether identification data has been stored for the photo print default device based on whether the IP address of the device is stored in the memory area A of the storage unit 18. The control unit 11 advances to S706 when determining in S703 that identification data has not been stored for a photo print default device (S703: NO) and advances to S704 when determining that identification data has been stored for a photo print default device (S703: YES).

In S704 the control unit 11 displays a Print Command window in the display area 101 for accepting a print command from the user. FIG. 15B shows a sample Print Command window 630. The control unit 11 displays the model number of the photo print default device in the Print Command window 630 together with icons 700 and 701. The Reselect icon 700 is a button for issuing a request to reselect the default device. By selecting the Reselect icon 700, the user can select a different device as the default device for photo printing when identification data for a device is already stored in the storage unit 18 as the default device, and the control unit 11 will store identification data for newly selected device in the storage unit 18. When the user selects a different device as the photo print default device, the control unit 11 overwrites the identification data currently stored in the storage unit 18 with identification data for the newly selected device. The Print icon 701 is selected to issue a print command.

In S705 the control unit 11 determines whether a request was received to reselect the photo print default device. Specifically, the control unit 11 determines whether an electric signal corresponding to the region in which the Reselect icon 700 is displayed was inputted from the touch panel 103. If this electric signal was inputted, the control unit 11 determines that a request for reselecting the default device was received. The control unit 11 advances to S706 upon determining that a reselect request was received (S705: YES) and advances to S709 upon determining that a reselect request was not received (S705: NO).

In S706 the control unit 11 displays the model numbers of selectable devices in the display area 101. More specifically, the control unit 11 controls the wireless communication unit 14 to broadcast a packet over the network 5 to which the data processing apparatus 1 is connected requesting devices to return their model numbers and information related to the functions they possess. In response, the requested data is returned from each device connected to the network 5. The wireless communication unit 14 receives a packet from each device that includes the model number of the device and information related to its functions. The packet received by the wireless communication unit 14 includes the IP address of the device as the source address and the IP address of the data processing apparatus 1 as the destination address. The control unit 11 correlates and stores in the RAM of the control unit 11 the model number, functional information, and IP address of the device received by the wireless communication unit 14.

FIG. 15C shows an example of data that the control unit 11 stores in the RAM of the control unit 11 in the fourth embodiment. Based on the data stored in RAM, the control unit 11 extracts model numbers for devices connected to the data processing apparatus 1 via the network 5 that possess a color print function. The control unit 11 displays a list of the extracted model numbers in the display area 101 in S706. In this example, the control unit 11 displays model numbers for two devices in the display area 101 since the MFP 2*a* (model number: Ink-MFP331) and the printer 2*c* (model number: Laser123) are the only devices that possess a color print function, as shown in FIG. 15C. Here, the control unit 11 is configured to extract only devices possessing a color print function since a photo print is normally performed in color.

In S707 the control unit 11 determines whether the user has selected a device. Specifically, the control unit 11 determines whether the touch panel 103 has inputted an electric signal corresponding to a region of the screen displayed in the display area 101 in S706 in which one of the device model numbers is displayed. When an electric signal corresponding to a region in which a device model number is displayed was inputted (S707: YES), the control unit 11 determines that the device having the model number displayed in the region corresponding to the electric signal was selected. The control unit 11 advances to S708 upon determining that a device was selected (S707: YES) and continues to repeat the determination in S707 when determining that no selection has been made (S707: NO).

In S708 the control unit 11 identifies the device selected in S707, i.e., the device having the model number displayed in the region corresponding to the electric signal inputted from the touch panel 103. The control unit 11 stores the IP address of the identified device in the memory area A of the storage unit 18 in correlation with the model number of the device, and displays the Print Command window in the display area 101. In other words, the control unit 11 sets and registers the selected device as the photo print default device.

In S709 the control unit 11 determines whether a print command was received. Here, the control unit 11 determines whether an electric signal corresponding to the region in which the Print icon 701 is displayed was inputted from the touch panel 103. The control unit 11 determines that a print command was inputted when an electric signal corresponding to the region in which the Print icon 701 is displayed was inputted from the touch panel 103. The control unit 11 advances to S710 upon determining that a print command was inputted (S709: YES) and returns to S705 upon determining that a print command was not inputted (S709: NO).

In S710 the control unit 11 sets the destination to the IP address read from the memory area A of the storage unit 18 and controls the wireless communication unit 14 to transmit a print request (print data) to the photo print default device for printing the image data selected in S702. In other words, the control unit 11 controls the photo print default device to print the image data.

In S711 the control unit 11 performs a process to store identification data for a Web print default device. This Web print default device storing process is a subroutine and will be described here with reference to FIG. 18. In S1001 of FIG. 18, the control unit 11 determines whether identification data for a Web print default device is currently stored in the storage unit 18. The Web print default device is preset in order to reduce the number of user operations for selecting devices when transmitting a print request to perform a Web page print process.

As with the photo print default device, a memory area B is allocated in the storage unit 18 for storing identification data identifying the default device for printing Web pages (Web print default device). If a print request to print a Web page was previously transmitted to a device, the IP address of that device is already stored in the memory area B of the storage unit 18. However, if the data processing apparatus 1 has not yet performed a Web page print process, an IP address for a default device has not yet been stored in the memory area B of the storage unit 18. Accordingly, in S1001 the control unit 11 determines whether identification data has been stored for a Web print default device according to the same method described in S703.

If identification data has not yet been stored for a Web print default device (S1001: NO), in S1002 the control unit 11 stores the identification data for the photo print default device in the memory area B of the storage unit 18 as identification data for the Web print default device. In other words, the control unit 11 extracts the device IP address from the memory area A of the storage unit 18 and stores this IP address in the memory area B of the storage unit 18 in correlation with the model number of the device. That is, the control unit 11 registers the photo print default device as the Web print default device. Subsequently, the control unit 11 ends the subroutine process. However, if identification data has already been stored for a Web print default device (S1001: YES), the control unit 11 ends the subroutine process without taking any action.

The control unit 11 stores the IP address of the photo print default device as identification data for the Web print default device in S1002 for the following reason. Normally, a device capable of performing color printing is selected as the default device for photo printing. On the other hand, the device selected as the default device for Web page printing might be a device capable of performing color printing or a device capable of only monochrome printing. In other words, the device selected as the photo print default device may be regarded as sufficiently satisfying the conditions for a Web print default device.

Figure 15A:
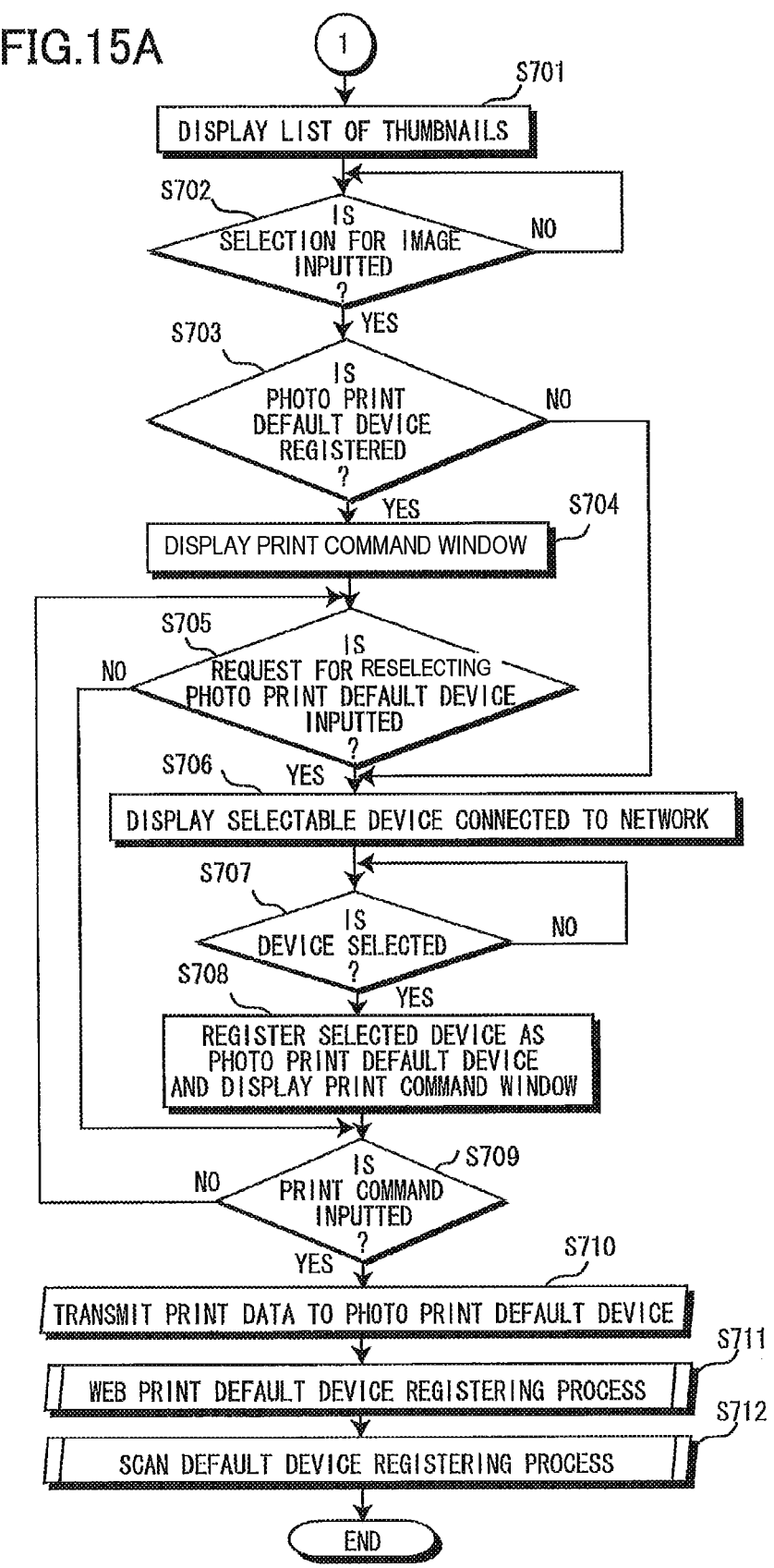
Figures 15B, 15C:
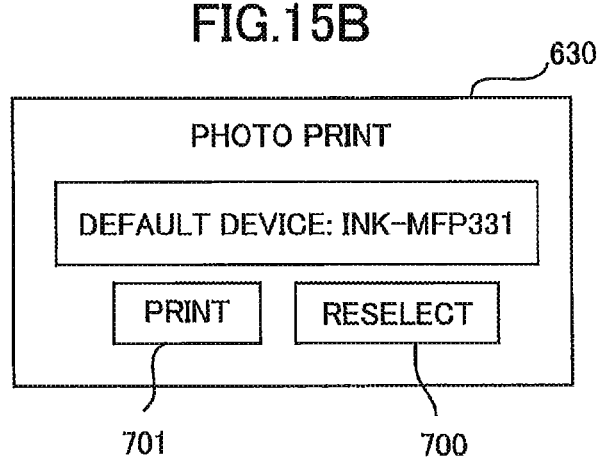
FIG. 15B is a diagram showing a print command window displayed on the data processing apparatus according to the fourth embodiment.
FIG. 15C is an explanatory diagram illustrating the content of data stored in the data processing apparatus according to the fourth embodiment.
Figure 18:
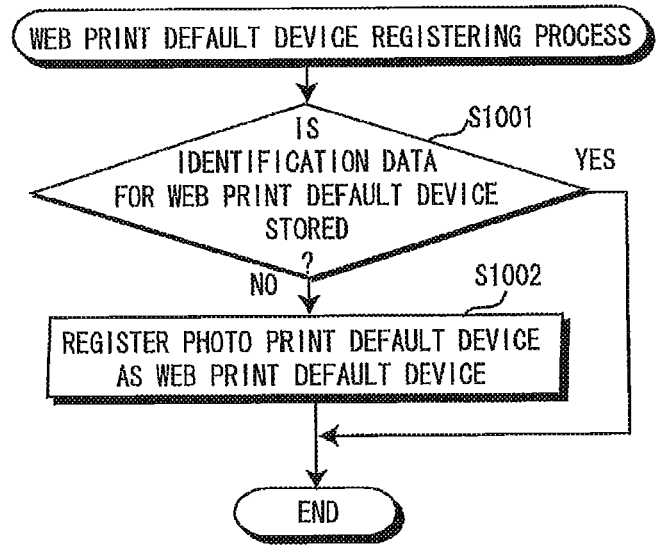
FIG. 18 is a flowchart illustrating steps in a web print default device registering process performed in S711 of the controlling process executed by the data processing apparatus according to the fourth embodiment.

After completing the subroutine in FIG. 18, the control unit 11 advances to S712 of FIG. 15A and performs another subroutine process for storing identification data identifying the default device for scans (scan default device). The scan default device storing process in S712 will be described here with reference to the flowchart in FIG. 19.

Figure 19:
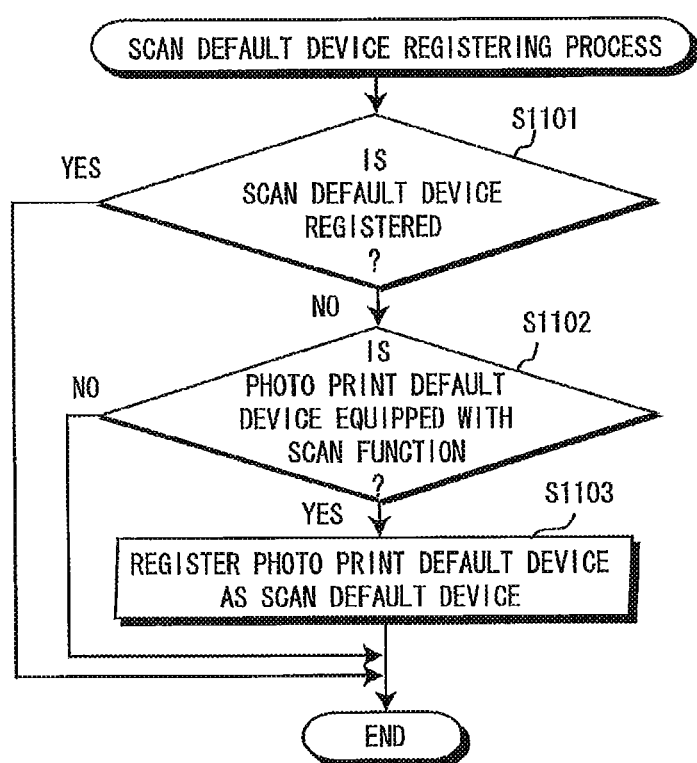
FIG. 19 is a flowchart illustrating steps in a scan default device registering process performed in S712 of the controlling process executed by the data processing apparatus according to the fourth embodiment.

In S1101 of FIG. 19, the control unit 11 determines whether identification data for a scan default device is currently stored in the storage unit 18. In other words, the control unit 11 determines whether or not the scan default device is currently registered. The scan default device is preset in order to reduce the number of user operations for selecting devices when transmitting a scan request.

As with the photo print default device and the Web print default device, a memory area C is allocated in the storage unit 18 for storing identification data identifying the default device for scanning pages (scan default device). If a scan request was previously transmitted to a device, the IP address of that device is already stored in the memory area C of the storage unit 18. However, if the data processing apparatus 1 has not yet performed a scan process, an IP address for a default device has not yet been stored in the memory area C of the storage unit 18. Accordingly, in S1101 the control unit 11 determines whether identification data has been stored for a scan default device according to the same method described in S703.

If identification data has not yet been stored for a scan default device (S1101: NO), the control unit 11 advances to S1102. In S1102 the control unit 11 determines whether the photo print default device is equipped with a scan function based on data (device information) that was stored in RAM in S706. In other words, the control unit 11 judges whether or not the photo print default device is suitable for the scanning process based on the device information. If the device possesses a scan function (S1102: YES), in S1103 the control unit 11 stores the identification data for the photo print default device in the storage unit 18 as identification data for the scan default device. In other words, the control unit 11 extracts the device IP address from the memory area A of the storage unit 18 and stores this address in the memory area C of the storage unit 18 in association with the device model number. That is, the control unit 11 registers the photo print default device as the scan default device. However, if the photo print default device does not possess a scan function (S1102: NO), the control unit 11 ends the current subroutine process.

Figure 16B:
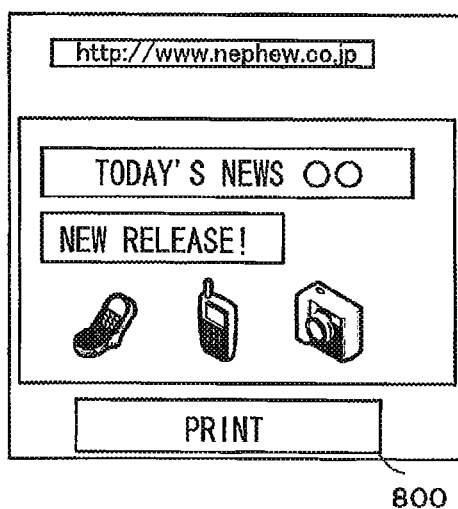
FIG. 16B is a diagram illustrating a Web page displayed on the data processing apparatus according to the fourth embodiment.

Next, the process performed when the control unit 11 proceeds to branch "2" based on the selection in S601 of FIG. 14 will be described with reference to the flowchart in FIG. 16A. In S801 of FIG. 16A, the control unit 11 displays the specified Web page in the display area 101. The method of displaying the Web page is not an essential component of the present invention and will not be described here. FIG. 16B shows a sample Web page displayed by the control unit 11 in the display area 101. In addition to the Web page, the control unit 11 displays the URL of the Web page and a Print icon 800 in the display area 101. The user selects the Print icon 800 to print the currently displayed Web page.

In S802 the control unit 11 determines whether an instruction to print the currently displayed Web page is inputted. That is, the control unit 11 determines whether an electric signal corresponding to the region of the touch panel 103 in which the print icon 800 is displayed was inputted from the touch panel 103. When an electric signal corresponding to such a region has been inputted, the control unit 11 determines that an instruction to print the currently displayed Web page was inputted. The control unit 11 continues to loop back to S802 and repeat the determination while determining that the instruction to print the Web page has not been inputted (S802: NO). Once the control unit 11 determines that the instruction to print the Web page was inputted (S802: YES), the control unit 11 advances to S803.

In S803 the control unit 11 determines whether identification data is stored in the storage unit 18 identifying the Web print default device according to the same method described in S703 in order to determine whether or not the Web print default device is registered. The control unit 11 advances to S806 when determining in S803 that identification data has not been stored for a Web print default device (S803: NO) and advances to S804 when determining that identification data has been stored for a Web print default device (S803: YES).

In S804 the control unit 11 displays a Print Command window 630 shown in FIG. 15B in the display area 101 for accepting a print command from the user.

In S805 the control unit 11 determines whether a request was received to reselect the Web print default device according to the same method of S705. The control unit 11 advances to S806 upon determining that a reselect request was received (S805: YES) and advances to S809 upon determining that a reselect request was not received (S805: NO).

In S806 the control unit 11 displays the model numbers of selectable devices in the display area 101 according to the same method of S706, and advances to S807. In S807 the control unit 11 determines whether the user has selected a device according to the same method of S707. The control unit 11 advances to S808 upon determining that a device was selected (S807: YES) and continues to repeat the determination in S807 when determining that no selection has been made (S807: NO).

In S808 the control unit 11 identifies the device selected in S807, stores the IP address of the identified device in the memory area B of the storage unit 18 in correlation with the model number of the device in order to register the selected device as Web print default device, and displays the Print Command window in the display area 101 according to the same method of S708. Then, the control unit 11 advances to S809.

In S809 the control unit 11 determines whether a print command was received according to the same method of S709. The control unit 11 advances to S810 upon determining that a print command was inputted (S809: YES) and returns to S805 upon determining that a print command was not inputted (S809: NO).

In S810 the control unit 11 sets the destination to the IP address read from the memory area B of the storage unit 18 and controls the wireless communication unit 14 to transmit a print request to the Web print default device for printing the Web page selected in S802. In other words, the control unit 11 controls the Web print default device to print the Web page. Then, the control unit 11 advances to S811.

In S811 the control unit 11 performs a photo print default device registering process to store identification data for a photo print default device. The photo print device registering process is a subroutine and will be described here with reference to FIG. 20A. In S1201 of FIG. 20A, the control unit 11 determines whether identification data for a photo print default device is currently stored in the storage unit 18 according to the same method of S703. If identification data has not yet been stored for a photo print default device (S1201: NO), the control unit 11 advances to S1202. However, if identification data has already been stored for a photo print default device (S1201: YES), the control unit 11 ends the subroutine process without taking any action.

In S1202 the control unit 11 determines whether the Web print default device to which the print request was transmitted in S810 is an inkjet printer based on data previously stored in RAM in S806. The control unit 11 advances to S1205 when the Web print default device is an inkjet printer (S1202: YES) and advances to S1203 when the Web print default device is not an inkjet printer (S1202: NO).

In S1203 the control unit 11 determines whether the Web print default device to which the print request was transmitted in S810 is a color laser printer based on data previously stored in RAM in S806. The control unit 11 advances to S1204 when the Web print default device is a color laser printer (S1203: YES). However, if the Web print default device is not a color laser printer (S1201: YES), the control unit 11 ends the subroutine process.

In S1204 the control unit 11 displays a message querying the user whether it is OK to store the IP address of the color laser printer corresponding to the Web print default device displayed in the display area 101 as identification data for the photo print default device. FIG. 20B shows a sample message 1000 displayed in the display area 101 in S1204. If an electric signal corresponding to a region displaying an icon that gives permission ("Yes" icon 1001 in FIG. 20B) was inputted from the touch panel 103, the control unit 11 determines that the user has given permission to store the IP address for the color laser printer (i.e., the Web print default device) as identification data for the photo print default device. On the other hand, if an electric signal corresponding to a region displaying an icon that does not give permission ("No" icon 1002 in FIG. 20B) was inputted from the touch panel 103, the control unit 11 determines that the user has not given permission to store this IP address as identification data for the photo print default device.

The control unit 11 advances to S1205 when the user gives permission to store the IP address of the Web print default device as the identification data for the photo print default device (S1204: YES), and ends the subroutine process when permission was not given (S1204: NO).

In S1205 the control unit 11 stores the identification data for the Web print default device in the storage unit 18 as identification data for the photo print default device. In other words, the control unit 11 extracts the device IP address from the memory area B of the storage unit 18 and stores this address in the memory area A of the storage unit 18 in association with the device model number. Accordingly, the control unit 11 registers the Web print default device as the photo print default device. Then, the control unit 11 ends the current subroutine process.

Figure 20A:
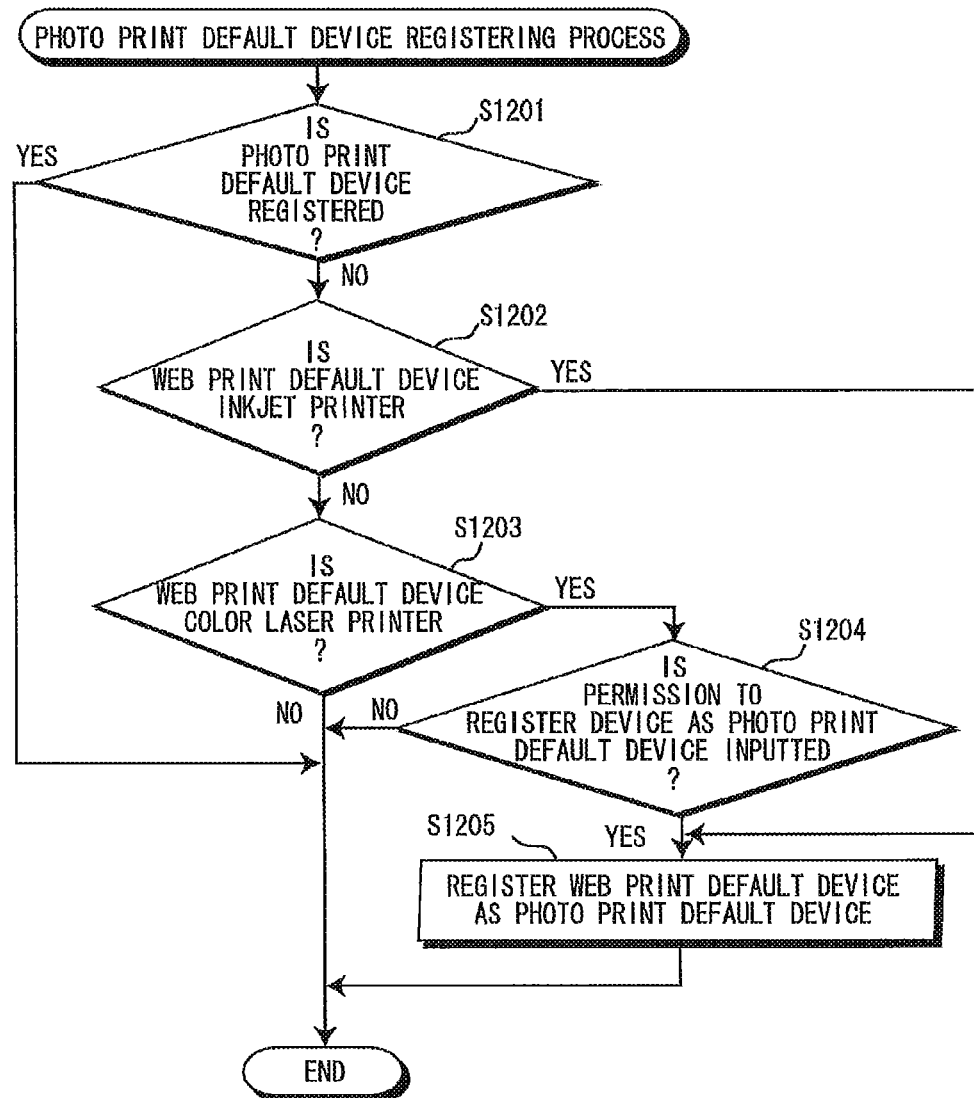
FIG. 20A is a flowchart illustrating steps in a photo print default device registering process performed in S811 of the controlling process executed by the data processing apparatus according to the fourth embodiment.
Figure 20B:
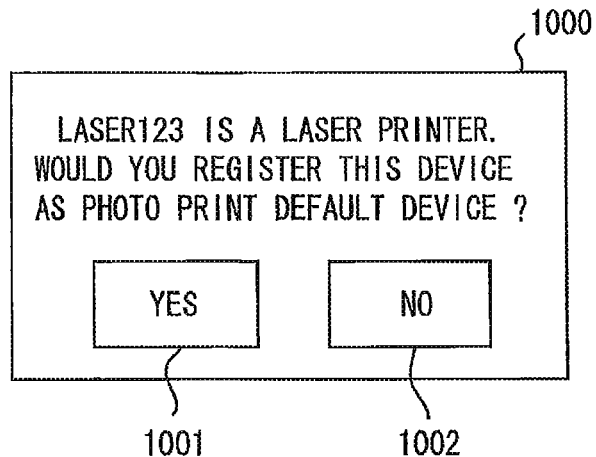
FIG. 20B is a diagram showing a message displayed on the data processing apparatus according to the fourth embodiment.

Unlike in the Web print default device registering process described in FIG. 18, in the photo print default device registering process of FIG. 20A the control unit 11 first determines whether the Web print default device meets a certain condition and stores the IP address of this Web print default device as identification data for the photo print default device only when the condition is met. The control unit 11 checks this condition for the following reason. Ordinarily a Web print default device must be provided with a monochrome print function at the minimum. Therefore, in S806 of FIG. 16A, the control unit 11 is configured to display in the display area 101 all devices possessing a print function that are connected to the network. If the control unit 11 were to store the IP address of the Web print default device unconditionally as the identification data for the photo print default device in FIG. 20A, there is a chance that the control unit 11 may store the IP address for a device that possesses only a monochrome print function as the identification data for the photo print default device.

The control unit 11 advances to S812 of FIG. 16A and performs the scan default device registering process for storing identification data identifying the default device for scans (scan default device). The subroutine process in S812 will be described here with reference to the flowchart in FIG. 21.

Figure 21:
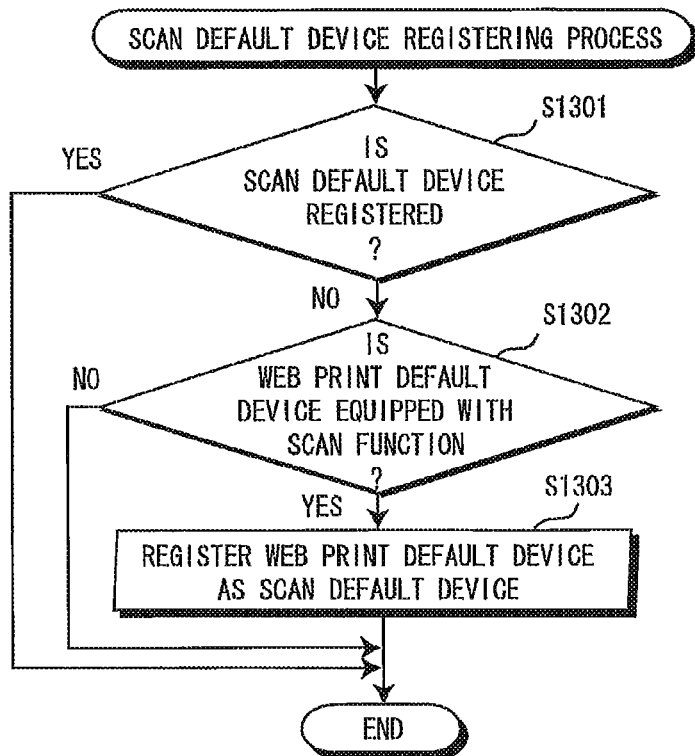
FIG. 21 is a flowchart illustrating steps in a scan default device registering process performed in S812 of the controlling process executed by the data processing apparatus according to the fourth embodiment.

In S1301 of FIG. 21, the control unit 11 determines whether identification data for a scan default device is currently stored in the storage unit 18 according to the same method described in S703. That is, the control unit 11 determines whether or not the scan default device is registered. If identification data is stored for a scan default device (S1301: YES), the control unit 11 ends this subroutines. If identification data has not yet been stored for a scan default device (S1301: NO), the control unit 11 advances to S1302.

In S1302 the control unit 11 determines whether the Web print default device is equipped with a scan function based on data that was stored in RAM in S806. If the device possesses a scan function (S1302: YES), in S1303 the control unit 11 stores the identification data for the Web print default device in the storage unit 18 as identification data for the scan default device. In other words, the control unit 11 extracts the device IP address from the memory area B of the storage unit 18 and stores this address in the memory area C of the storage unit 18 in association with the device model number. However, if the Web print default device does not possess a scan function (S1302: NO), the control unit 11 ends the current subroutine process.

Next, the process performed when the control unit 11 proceeds to branch "3" based on the selection in S601 of FIG. 14 will be described with reference to the flowchart in FIG. 17A. In S901 of FIG. 17A, the control unit 11 determines whether or not the identification data for scan default device, i.e., whether or not the scan default device is registered according to the same method described in S703. The control unit 11 advances to S904 when determining in S901 that identification data has not been stored for a scan default device (S901: NO) and advances to S902 when determining that identification data has been stored for a scan default device (S901: YES).

Figure 17B:
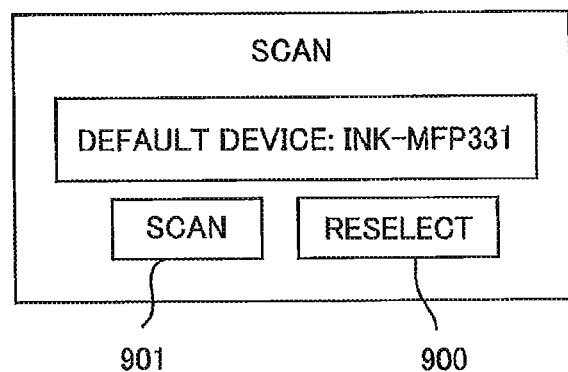
FIG. 17B is a diagram illustrating a scan command window displayed on the data processing apparatus according to the fourth embodiment.

In S902 the control unit 11 displays a Scan Command window in the display area 101 for transmit a scan request from the user. FIG. 17B shows a sample Scan Command window. The control unit 11 displays the model number of the photo print default device in the Print Command window together with icons 900 and 901 (FIG. 17B). The Reselect icon 900 is a button for issuing a request to reselect the scan default device.

In S903 the control unit 11 determines whether a request was received to reselect the scan default device according to the same method of S705. The control unit 11 advances to S904 upon determining that a reselect request was received (S903: YES) and advances to S907 upon determining that a reselect request was not received (S903: NO).

In S904 the control unit 11 displays the model numbers of selectable devices having the scan function in the display area 101 according to the same method of S706, and advances to S905.

In S905 the control unit 11 determines whether the user has selected a device according to the same method of S707. The control unit 11 advances to S906 upon determining that a device was selected (S905: YES) and continues to repeat the determination in S905 when determining that no selection has been made (S905: NO).

In S906 the control unit 11 identifies the device selected in S905, stores the IP address of the identified device in the memory area C of the storage unit 18 in correlation with the model number of the device, and displays the Scan Command window in the display area 101 according to the same method of S708. Then, the control unit 11 advances to S907.

In S907 the control unit 11 determines whether a scan command to transmit a scan request was received according to the same method of S709. The control unit 11 advances to S908 upon determining that a scan command was inputted (S907: YES) and returns to S903 upon determining that a scan command was not inputted (S907: NO).

In S908 the control unit 11 sets the destination to the IP address read from the memory area C of the storage unit 18 and controls the wireless communication unit 14 to transmit a scan request to the scan default device having this IP address. In response, the wireless communication unit 14 receives scan data from the scan default device. In other words, the control unit 11 controls the scan default device to perform the scanning process. The control unit 11 stores the scan data received by the wireless communication unit 14 in the storage unit 18 or the like.

In S909 the control unit 11 performs a Web print default device registering process to store identification data for a Web print default device. This process is a subroutine and will be described here with reference to FIG. 22.

Figure 22:
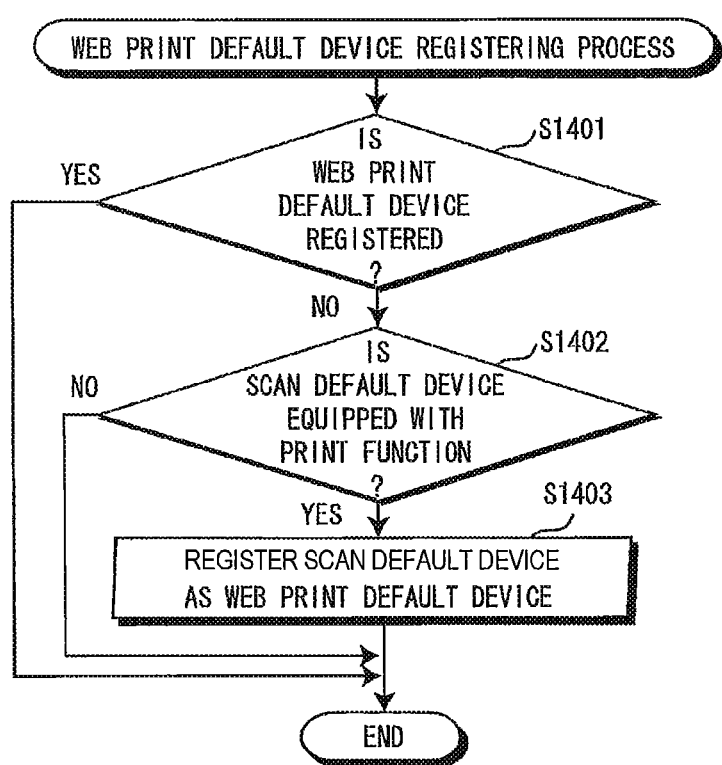
FIG. 22 is a flowchart illustrating steps in a web print default device registering process performed in S909 of the controlling process executed by the data processing apparatus according to the fourth embodiment.

In S1401 of FIG. 22, the control unit 11 determines whether identification data for a Web print default device is currently stored in the storage unit 18 in order to determine whether or not the Web print default device is registered according to the same method described in S703. If identification data has not yet been stored for a Web print default device (S1401: NO), the control unit 11 determines whether or not the Web print default device is equipped with a scan function in S1402. However, if identification data has already been stored for a Web print default device (S1401: YES), the control unit 11 ends the subroutine process without taking any action.

In S1402 the control unit 11 determines whether the scan default device is equipped with a printing function based on data that was stored in RAM in S904. If the device is equipped with a printing function (S1402: YES), in S1403 the control unit 11 stores the identification data for the scan default device in the storage unit 18 as identification data for the Web print default device. In other words, the control unit 11 registers the scan default device as the Web print default device. However, if the device does not possess a printing function (S1402: NO), the control unit 11 ends the subroutine process without taking any action.

The control unit 11 stores identification data for the scan default device default device as identification data for the Web print default device in S1403. In other words, the control unit 11 extracts the device IP address from the memory area C of the storage unit 18 and stores this IP address in the memory area B of the storage unit 18 in correlation with the model number of the device (S1403). Subsequently, the control unit 11 ends the subroutine process.

After completing the subroutine process in FIG. 22, the control unit 11 returns to S910 of FIG. 17A and performs a photo print default device registering process to store identification data for the photo print default device. This process is also a subroutine and will be described here with reference to FIG. 23. The steps in this subroutine process closely resemble those in the subroutine process shown in FIG. 20A. The difference between these processes is only that the control unit 11 determines whether to store identification data for the Web print default device as identification data for the photo print default device in the process of FIG. 20A, whereas the control unit 11 determines whether to store identification data for the scan default device as identification data for the photo print default device in the process of FIG. 23. Accordingly, a detailed description of the process in FIG. 23 will not be included here.

Figure 23:
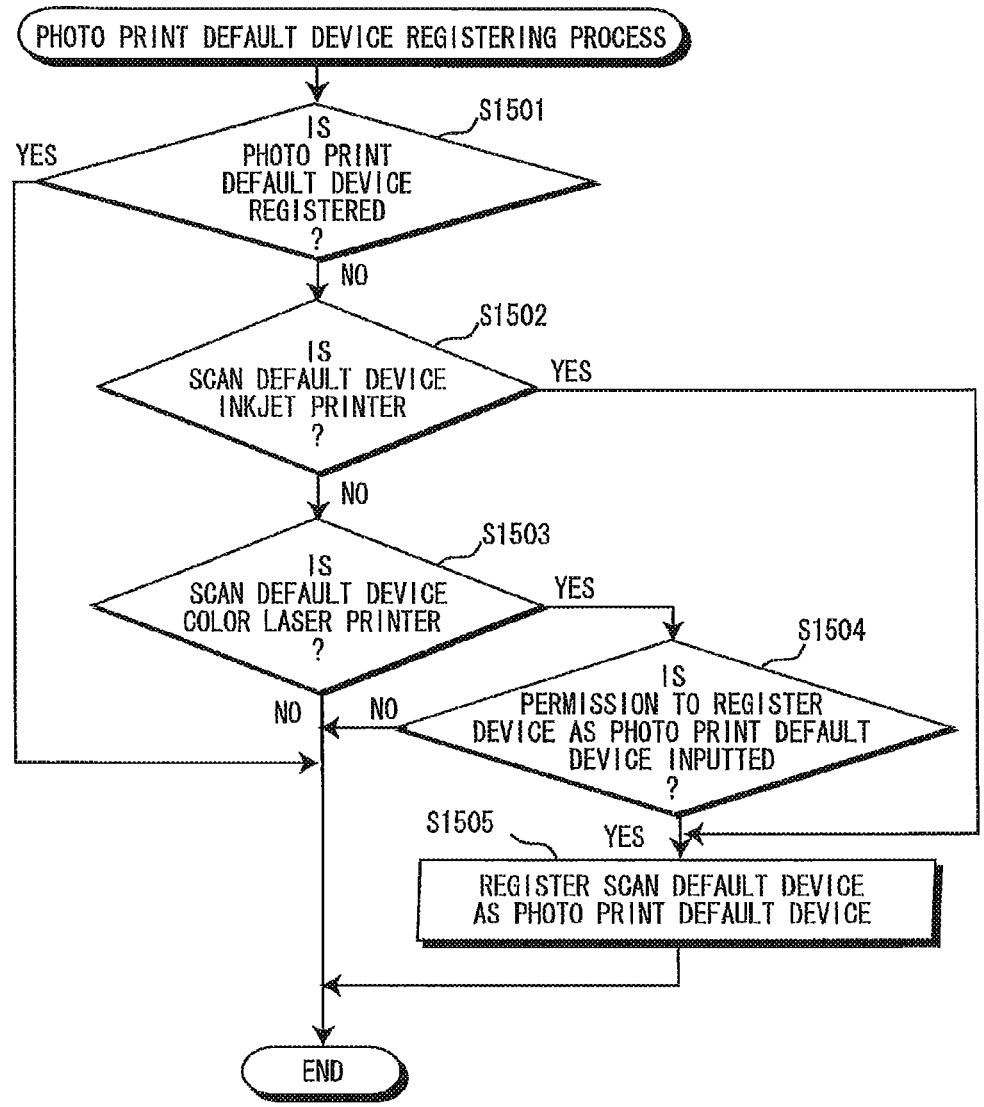
FIG. 23 is a flowchart illustrating steps in a photo print default device registering process performed in S910 of the controlling process executed by the data processing apparatus according to the fourth embodiment.

After completing the subroutine process in FIG. 23, the control unit 11 again returns to the flowchart in FIG. 17A and ends the process of FIG. 17A.

With the data processing apparatus 1 according to the fourth embodiment described above, the control unit 11 stores identification data for default devices in the storage unit 18 for each available function of the data processing apparatus 1, including a photo print, a Web print, and a scan operation. Accordingly, the user can employ a suitable device for each function.

Further, after the control unit 11 of the data processing apparatus 1 stores identification data for a default device suited to one function, the control unit 11 can store this identification data to identify the default device for other functions after determining that the device is suitable for these functions. Thus, the data processing apparatus 1 reduces the number of steps that a user must perform in order to store data for devices suited to each available function.

In a fifth embodiment of the present invention, the data processing apparatus 1 can launch the print-and-scan application while data to be handled in the application has already been specified. The control unit 11 determines whether a command has been inputted to launch the print-and-scan application, either while a Web page is displayed in the display area 101 according to the Web browser application or while image data is displayed in the display area 101 according to the photo viewer application. An icon is provided in both the Web browser application and the photo viewer application for inputting a command to launch the print-and-scan application. When an electric signal corresponding to the region of the display area 101 in which this icon is displayed is inputted from the touch panel 103, the control unit 11 determines that a command has been issued to launch the print-and-scan application and begins a process based on the print-and-scan application.

When starting the controlling process based on the print-and-scan application while a Web page is displayed in the display area 101, the control unit 11 reads a URL from a memory area in the RAM of the control unit 11 used for executing the Web browser application, which URL indicates the location of data on the Internet for the displayed Web page. The control unit 11 stores this URL in a memory area D (not shown) of RAM that is used when executing the print-and-scan application. On the other hand, when the control unit 11 starts the process based on the print-and-scan application while image data is displayed in the display area 101, the control unit 11 reads location data indicating the absolute path of the displayed image data from a memory area of RAM used when executing the photo viewer application. The control unit 11 stores this location data in a memory area of RAM used for executing the print-and-scan application.

Next, the controlling process executed by the control unit 11 according to the print-and-scan application for controlling components of the data processing apparatus 1 will be described with reference to FIG. 24. This process begins when the control unit 11 launches the print-and-scan application while executing a process according to the Web browser application or the photo viewer application. In S1601 of FIG. 24, the control unit 11 determines whether the data stored in the memory area D of RAM is location data for image data or a URL. If the stored data is a URL (S1601: URL), the control unit 11 advances to S1612, acquires the Web page data from the Internet and performs a Web page print process to print the Web page. If the stored data is location data for image data (S1601: location data for image data), the control unit 11 advances to S1602 and performs a photo print process.

The process in S1602-S1608 is identical to the process in S703-S709 described in FIG. 15A and will not be repeated here. In S1609 the control unit 11 sets the destination for a print request to the IP address of the photo print default device read from the memory area A of the storage unit 18 and controls the wireless communication unit 14 to transmit a print request to this destination for printing the image specified by the location data of image data stored in the memory area D of RAM. The process in S1610-S1611 is identical to the process in S711-S712 described in FIG. 15A and will not be repeated here.

The process in S1612-S1618 is identical to the process in S803-S809 described in FIG. 16A and will not be repeated here. In S1619 the control unit 11 sets the destination for a print request to the IP address of the Web print default device read from the memory area B of the storage unit 18 and controls the wireless communication unit 14 to transmit a print request to this destination for printing the image specified by the location data of image data stored in the memory area D of RAM.

With the data processing apparatus 1 according to the fifth embodiment described above, the control unit 11 can store identification data of default devices suitable for the various data for which output commands are received. Accordingly, the user can employ a device suited to the type of data being outputted.

After storing identification data of a default device for one type of data, the control unit 11 can store the same identification data to identify the default devices for other types of data or other functions after determining that the device is suitable for the other types of data or functions. Hence, the data processing apparatus 1 according to the fifth embodiment can easily register devices suitable for each type of data and function through fewer user operations.

The present invention is not limited to the descriptions in the fourth and fifth embodiments; many modifications and variations may be made therein without departing from the spirit of the invention, the scope of which is defined by the attached claims.

In S706 of FIG. 15A according to the fourth embodiment, data received by the data processing apparatus 1 related to the device model numbers and functions may be configured of data received only from devices possessing a color print function. More specifically, the control unit 11 controls the wireless communication unit 14 to broadcast a packet over the network to which the data processing apparatus 1 is connected requesting devices possessing a color print function to return their model numbers and information related to the functions they possess. In response, the requested data is returned only from devices connected to the network having a color print function. The wireless communication unit 14 receives data related to the device model number and functions returned from only these devices. The control unit 11 stores the model number and functional information received by the wireless communication unit 14 in RAM. The control unit 11 displays a list in the display area 101 of all extracted model numbers for devices stored in RAM. This process may also be applied to S806 in FIG. 16A, S904 in FIG. 17A, and S1605 and S1615 in FIG. 24 (according to the fifth embodiment).

In the fourth and fifth embodiments described above, the data processing apparatus 1 is configured to issue a request to devices connected to the network for their model number and information related to the functions they possess and to receive these model numbers and functional information returned from the devices in response. However, the model numbers and functional information for all devices that the data processing apparatus 1 can use when executing the print-and-scan application may be preprogrammed in the print-and-scan application. In this case, the data processing apparatus 1 may be configured to perform the following process in S706 of FIG. 15A, for example.

That is, the wireless communication unit 14 receives the model numbers of devices connected to the network. The control unit 11 compares the model numbers of devices preprogrammed in the print-and-scan application with the model numbers received by the wireless communication unit 14 for devices connected to the network and extracts all matching model numbers. Next, the control unit 11 reads information related to the functions of devices having the extracted model numbers from the print-and-scan application. The control unit 11 stores functional information for devices having the extracted model numbers in RAM in association with their model numbers and their IP addresses on the network. The information stored in RAM is identical to that shown in FIG. 15C, as described in the fourth embodiment. Next, the control unit 11 extracts the model numbers of devices connected to the network that have a print function based on the information stored in RAM. The control unit 11 displays a list of the extracted model numbers in the display area 101.

The model numbers of devices preprogrammed in the print-and-scan application need not perfectly match the model numbers of devices connected to the network, i.e., the control unit 11 may be configured to extract model numbers showing a partial match. For example, if the model number of a device provided in the print-and-scan application is "Ink-MFP331" while the model number of a device connected to the network is "Ink-MFP431," it is clear that the two devices belong to the same series, since their model numbers both begin with "Ink-MFP." Since it is likely that the device "Ink-MFP431" possesses an inkjet color print function, scan function, and copy function, the model number for the device "Ink-MFP431" may be extracted as a device identical to the device having model number "Ink-MFP331," which is preprogrammed in the print-and-scan application.

The model number may be any type of identifier that can distinguish devices. For example, the model number may be configured of only symbols and need not include numbers. Further, a device name or other name capable of distinguishing a device may be used in place of the model number.

When the control unit 11 executes the process in S707 of FIG. 15A according to the fourth embodiment (i.e., after the control unit 11 reaching a NO determination in S703 or a YES determination in S705), the control unit 11 may store identification data for the device selected in S707 in RAM. In this case, after executing the process in S707, in the subsequent process of S711 or S712 the control unit 11 may be configured to use the device IP address that was stored in RAM in S707 rather than the IP address stored in the memory area A of the storage unit 18. Further, the control unit 11 may execute the processes in S711 and S712 between steps S707 and S708. Alternatively, the processes in S711 and S712 may be performed between S708 and S709 or between S709 and S710. The same configuration may also be applied to the processes described in FIGS. 16A, 17A, and 24 (fifth embodiment).

In S706 of FIG. 15A, the control unit 11 in the fourth embodiment is configured to display in the display area 101 the model numbers of only those devices connected to the network that possess a color printing function, but the control unit 11 may instead be configured to display in the display area 101 the model numbers of only those devices possessing a color inkjet printing function. Similarly, in S806 of FIG. 16A the control unit 11 of the fourth embodiment is configured to display in the display area 101 the model numbers of only those devices connected to the network that possess a printing function, but the control unit 11 may be configured to display model numbers in the display area 101 for only those devices that possess a color printing function.

In the process of FIG. 15A, the control unit 11 may be configured to select the device determined to be most suitable for printing photographs and to store identification data for this device as the photo print default device. In this case, the following process may be performed in place of steps S706 and S707. Specifically, the control unit 11 controls the wireless communication unit 14 to broadcast a packet over the network to which the data processing apparatus 1 is connected requesting devices to return their model numbers and information related to the functions they possess. In response, the requested data is returned from each device connected to the network. The control unit 11 controls the wireless communication unit 14 to receive the model number and functional information returned from each device and stores this model number and functional information in RAM.

The control unit 11 selects one device connected to the data processing apparatus 1 via the network that is most suitable for printing photographs based on the information stored in RAM. The process in S708 and subsequent steps may be configured identically to that described in the fourth embodiment. Some examples of conditions used to determine whether a device is suitable for photo printing are (1) the possession of a color inkjet printing function and (2) the ability to use photo-quality recording paper. Similarly, in the processes of FIGS. 16A and 17A, the control unit 11 may automatically select a device best-suited to printing Web pages and a device best-suited to scanning.

The conditions under which the control unit 11 stores a device as a default device are not limited to those described in FIGS. 18-19, 20A, and 21-23. For example, it is possible to add such conditions as (1) a device can be stored as a Web print default device only when the device can perform color printing, and (2) a device can be stored as the scan default device only when the resolution of the scanning function meets or exceeds a threshold value.

Additionally, the data processing apparatus 1 may be configured to query the user on whether to record a device as the default device. In this case, the data processing apparatus 1 records the device as the default device only after receiving user authorization.

When a device can be stored as the Web print default device only when capable of performing color printing, the control unit 11 may perform a determination in place of that described in S1402 of FIG. 22 for determining whether the scan default device possesses a color printing function. In this case, the control unit 11 advances to S1403 when the scan default device possesses a color printing function and ends the process of FIG. 22 when the scan default device does not possess a color printing function.

Similarly, when a device can be stored as the scan default device only when the resolution of the scanning function meets or exceeds a threshold value, the control unit 11 may be configured to perform an additional step between S1102 and S1103 in FIG. 19 for determining whether the scanning resolution meets or exceeds the prescribed value. In this case, the control unit 11 advances to S1103 when the resolution is at least the prescribed value and ends the process of FIG. 19 when the resolution is less than the prescribed value. The same condition for scanning resolution may also be incorporated in the flowchart of FIG. 21. In this case, the control unit 11 acquires the resolution of a scanning function as functional information of the devices in S706 of FIG. 15A and in S806 of FIG. 16A.

In the fourth embodiment, the IP address of a device that was not selected in S705 of FIG. 15A cannot be stored as the identification data for the Web print default device or the scan default device in FIGS. 18 and 19. For example, if the MFP 2a shown in FIG. 2 was not selected in S707 of FIG. 15A, the IP address of the MFP 2a is not stored in the memory area C of the storage unit 18 in FIG. 19. However, the data processing apparatus 1 may be configured to be able to store the IP address of devices not selected in S705 of FIG. 15A in the memory area C of the 18 in FIG. 19. In this case, the control unit 11 executes the following process described with reference to FIG. 25 in place of the process in FIG. 19.

Figure 25:
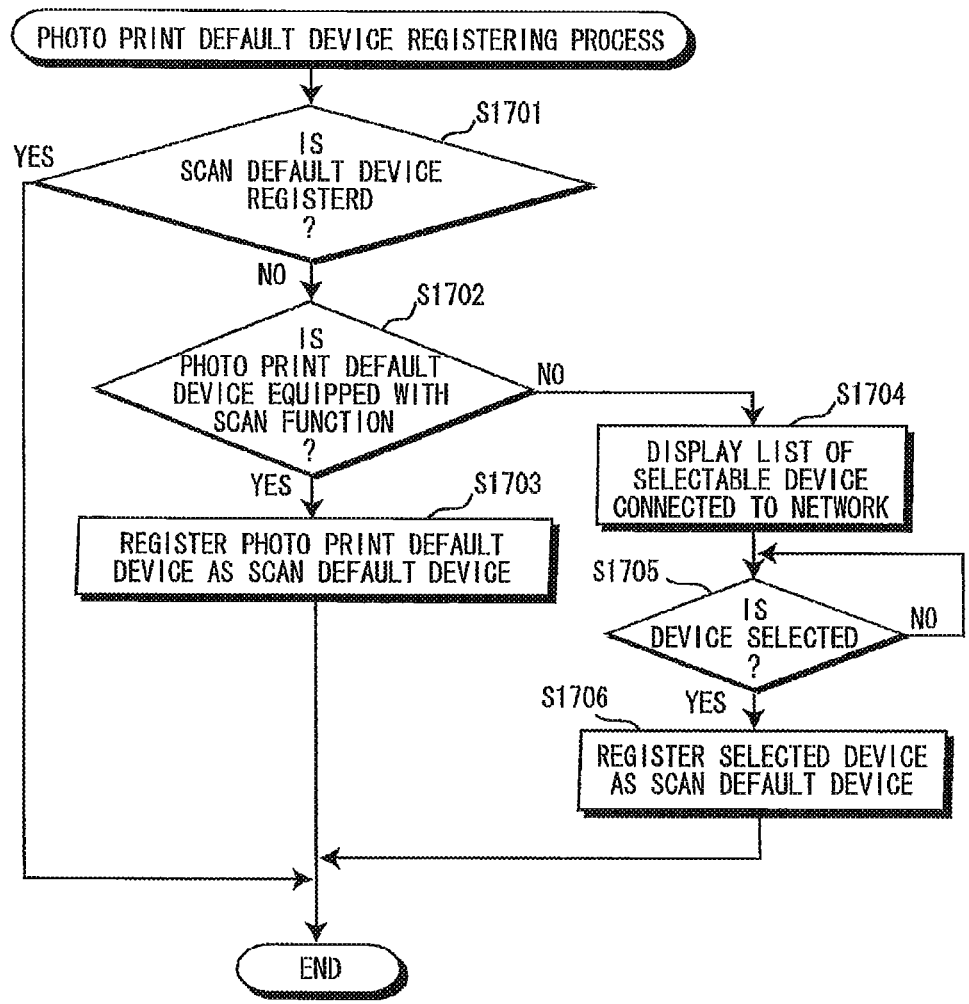
FIG. 25 is a flowchart illustrating steps in a photo print default device registering process performed in S712 of the controlling process shown in FIG. 15 according to a modification of the fourth embodiment.

As in S1101 of FIG. 19, in S1701 of FIG. 25 the control unit 11 determines whether identification data for a scan default device is currently stored in the storage unit 18. The control unit 11 ends the process in FIG. 25 when determining that identification data is stored for a scan default device (S1701: YES) and advances to S1702 when identification data has not been stored for a scan default device (S1701: NO).

In S1702 the control unit 11 determines whether the photo print default device is equipped with a scan function based on data that was stored in RAM in S706. If the device possesses a scan function (S1702: YES), in S1703 the control unit 11 stores the identification data for the photo print default device in the storage unit 18 as identification data for the scan default device. In other words, the control unit 11 extracts the device IP address from the memory area A of the storage unit 18 and stores this address in the memory area C of the storage unit 18 in association with the device model number. However, if the photo print default device does not possess a scan function (S1702: NO), the control unit 11 advances to S1704.

In S1704 the control unit 11 extracts the model numbers of devices connected to the network that have a scan function based on data that was stored in RAM in S706. The control unit 11 displays a list of extracted model numbers in the display area 101.

In S1705 the control unit 11 determines whether the user has selected a device according to the same method of S707. The control unit 11 advances to S1706 upon determining that a device was selected (S1705: YES) and continues to repeat the determination in S1705 when determining that no selection has been made (S1705: NO).

In S1706 the control unit 11 identifies the device selected in S1705, stores the IP address of the identified device in the memory area C of the storage unit 18 in correlation with the model number of the device according to the same method of S708. Then, the control unit 11 ends this subroutine process.

Alternatively, in place of steps S1704-S1706 of FIG. 25, the control unit 11 may be configured to select a single device best-suited for scanning from among the devices connected to the network based on the data that was stored in RAM in S703. For example, the control unit 11 may automatically select the device supporting the highest scanning resolution. This configuration may also be applied to the processes described in FIGS. 18, 20A, and 21-23.

In addition to the photo print function and Web print function, the print-and-scan application may also include a document print function. In this case, the data processing apparatus 1 stores a document default device used in a document print function for printing document data, such as .pdf files and .doc files created with an application program.

The types of data and functions made available in the data processing apparatus 1 may be fewer or more numerous than those described in the fourth and fifth embodiments.

The control unit 11 may be configured to execute the processes in S701 and S702 of FIG. 15A and the processes in S801 and S802 of FIG. 16A according to an operating system (OS) or other application programs preinstalled on the data processing apparatus 1. With this configuration, in S702 the control unit 11 extracts location data for image data stored in an area of RAM referenced when executing a process according to the OS or other application program and stores this location data in an area of RAM used when executing the print-and-scan application. The processes in S703 and subsequent steps are identical to those described in the fourth embodiment. Similarly, in S802 the control unit 11 extracts the URL stored in an area of RAM that is used when the control unit 11 executes a process according to the OS and stores this URL in an area of RAM referenced when executing the print-and-scan application. The processes in S803 and subsequent steps are identical to those described in the fourth embodiment.

The data processing apparatus of the present invention may have a configuration for connecting to external memory, such as an SD card. Hence, instead of using flash memory, the data processing apparatus may store various data in the external memory.

Figure 24:
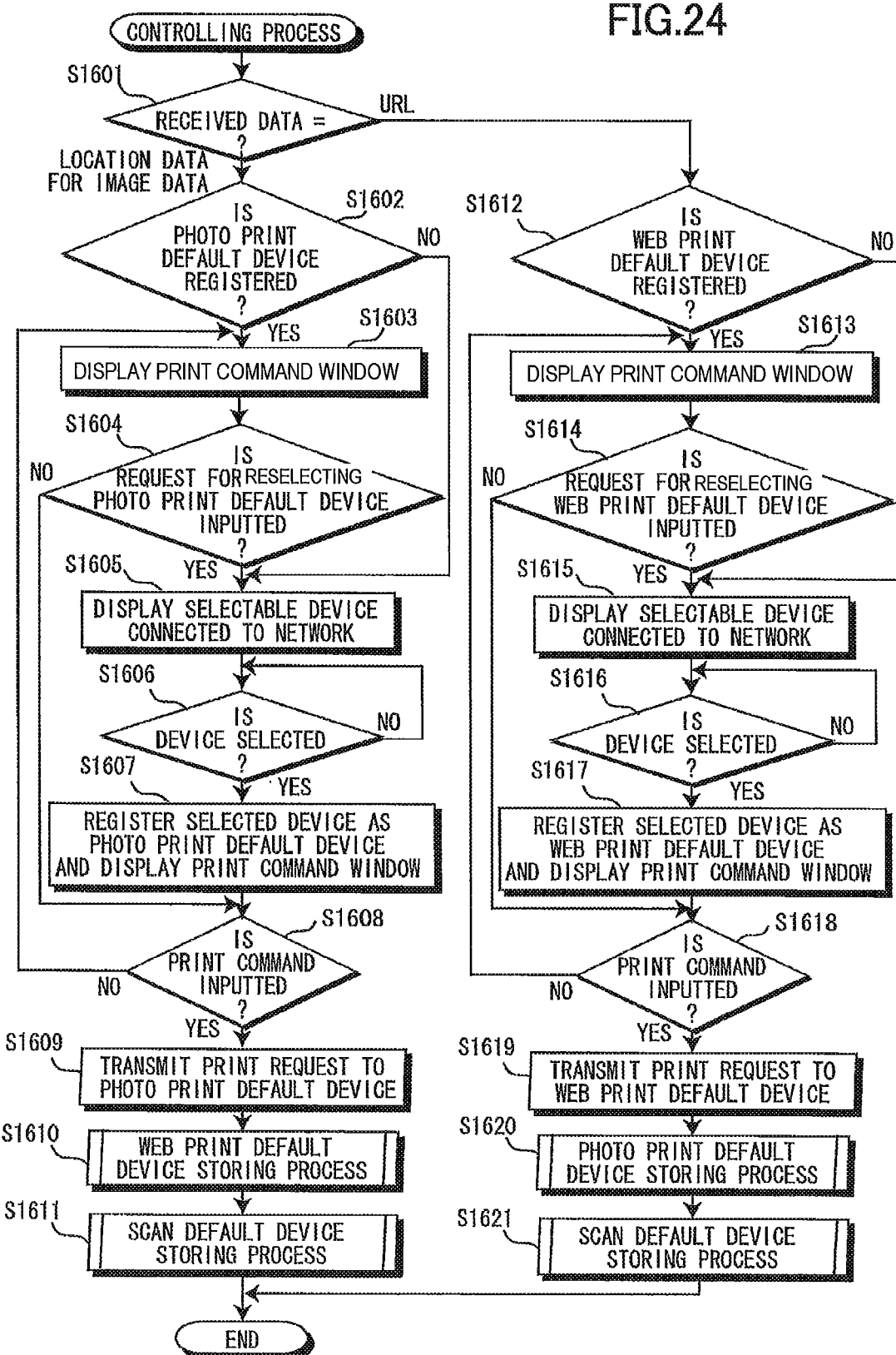
FIG. 24 is a flowchart illustrating steps in a controlling process executed by a data processing apparatus according to a fifth embodiment of the invention.

When determining whether identification data is stored for a default device in S703 of FIG. 15A, S803 of FIG. 16A, S901 of FIG. 17A, S1001 of FIG. 18, S1101 of FIG. 19, S1201 of FIG. 20A, S1301 of FIG. 21, S1401 of FIG. 22, S1501 of FIG. 23, and S1602 and S1612 of FIG. 24, the control unit 11 may determine whether identification data was stored or not stored based on whether the data bits of the memory area A, B, or C in the storage unit 18 are not all set to "0" or are all set to "0". Further, the control unit 11 may determine whether identification data is stored for the default device based on whether an invalid bit for invalidating stored identification data has been set. The invalid bit is stored in part of the memory area of the storage unit 18 for storing identification data (generally the first bit). Alternatively, a flag for invalidating identification data may be stored in place of the invalid bit in a separate memory area from the area of the storage unit 18 used for storing identification data, and the control unit 11 may determine whether identification data is stored based on this flag.

When the control unit 11 stores identification data for the photo print default device in S708, instead of storing the IP address of the device in the memory area A of the storage unit 18 in association with the device model number, the control unit 11 may be configured to perform the following process. That is, the control unit 11 may store data indicating that the device is a photo print default device and the IP address of the device in the storage unit 18 in association with the device model number. Consequently, in S710 the control unit 11 reads the IP address of the device from the memory area of the storage unit 18 in which the data indicating that the device is a photo print default device and the device IP address are stored in association with the device model number, sets the destination to this IP address, and controls the wireless communication unit 14 to transmit a print request to the photo print default device for printing the image data selected in S702. The method described above may also be applied to the processes in S808 of FIG. 16A, S906 of FIG. 17A, S1002 of FIG. 18, S1103 of FIG. 19, S1205 of FIG. 20A, S1303 of FIG. 21, S1403 of FIG. 22, S1505 of FIG. 23, and S1607 and S1617 of FIG. 24.

When the control unit 11 stores identification data of the photo print default device in the memory area B of the storage unit 18 as identification data for the Web print default device in S1002 of FIG. 18, the control unit 11 may store information, rather than the IP address, giving directions to reference the data stored in the memory area A of the storage unit 18. This same format may be applied to the processes in S1103 of FIG. 19, S1205 of FIG. 20A, S1303 of FIG. 21, S1403 of FIG. 22, and S1505 of FIG. 23.

The control unit 11 may be configured to store the URL or MAC address of a device in the memory area A, B, or C of the storage unit 18 in place of the IP address as identification data for the default device. When the control unit 11 is configured to store a MAC address in the memory area A, B, or C, the data processing apparatus 1 transmits a MAC frame instead of a packet that includes the MAC address of the device as the destination address and the MAC address of the data processing apparatus 1 as the source address. When configured to store a URL in the memory area A, B, or C, the control unit 11 may acquire the IP address associated with the URL and use this IP address to communicate with the device.

In S707 of FIG. 15A, the user may be allowed to select a plurality of devices. In such a case, the processes in S707-S710 are implemented as follows. After a window is displayed in the display area 101 in S706, in S707 the control unit 11 determines whether electric signals have been inputted a prescribed number of times from the touch panel 103 for regions of the display area 101 in which device model numbers are displayed. The control unit 11 determines that selections have been received for devices whose model numbers were displayed in touched regions when electric signals corresponding to regions displaying model numbers have been inputted for the prescribed number of devices. The control unit 11 advances to S708 when determining that the prescribed number of devices have been selected (S707: YES) and continues to repeat the determination in S707 when determining that not all selections have been received (S707: NO).

In S708 the control unit 11 stores the IP address for each of the prescribed number of devices selected in S707 in the memory area A of the storage unit 18 in correlation with the model number of the corresponding device. At this time, the control unit 11 may be configured to add the identification data for newly selected devices to identification data already stored in the memory area A of the storage unit 18 rather than overwriting the existing identification data with the identification data of the newly selected devices. The control unit 11 may also set the invalid bit described above in all identification data for the photo print default devices stored in the memory area A of the storage unit 18. The control unit 11 also displays the Print Command window in the display area 101 in S708. Here, the control unit 11 displays in the Print Command window the model numbers of all devices selected in S707 rather than the model number of the photo print default device that were stored in the memory area.

In S709 the control unit 11 determines whether a print command was received. Specifically, the control unit 11 determines whether an electric signal corresponding to a region in the display area 101 in which the Print icon 701 for issuing a print command is displayed has been inputted from the touch panel 103. If the touch panel 103 inputted an electric signal corresponding to the region displaying the Print icon 701, the control unit 11 determines that a print command was inputted. Upon determining that a print command was inputted, the control unit 11 further determines whether the touch panel 103 has inputted an electric signal corresponding to a region of the Print Command window in which one of the plurality of device model numbers is displayed. If the control unit 11 determines that an electric signal corresponding to a region displaying a model number was inputted (S709: YES), the control unit 11 determines that the device having the model number displayed in the region corresponding to the inputted electric signal was selected and clears the invalid bit set in the identification data for the selected device.

In S710 the control unit 11 controls the wireless communication unit 14 to transmit a print request to the device selected in S709 for printing image data. However, if the control unit 11 determines that a print command was not inputted or that a device was not selected (S709: NO), the control unit 11 returns to S705. The remainder of this process is identical to that described in the fourth embodiment.

Alternatively, the following process may be implemented in S709 and S710. When the touch panel 103 has inputted an electric signal corresponding to a region displaying the Print icon 701, the control unit 11 selects the best-suited device for photo printing from the plurality of photo print default devices and clears the invalid bit set in the identification data for the selected device. In S710 the control unit 11 controls the wireless communication unit 14 to transmit a print request for printing image data to the photo print default device whose invalid bit was cleared in S709. These methods may also be applied to S807-S810 of FIG. 16A; S905-S908 of FIG. 17A; and S1606-S1609 and S1616-S1619 of FIG. 24.

When the wireless communication unit 14 fails to transmit the print request in S710 of FIG. 15A, the control unit 11 may perform the following procedure. First, the control unit 11 determines whether transmission of the print request failed. When a failure has occurred, the control unit 11 displays an error message in the display area 101 together with an "OK" icon. The control unit 11 returns to S704 after the touch panel 103 has inputted an electric signal corresponding to the region of the display area 101 in which the OK icon is displayed. In this way, the user may indicate a desire to reselect the photo print default device in S705 and can select a desired device in S706 from the available devices displayed in the display area 101. This same procedure may also be applied to the processes in FIGS. 16A, 17A, and 24.

In a sixth embodiment, the data processing apparatus 1 stores a default device and settings for each of the functions photo print, Web print, and scan. Here, "settings" denotes the values of various options that can be set for processes performed using the functions available on a device. For example, the settings may indicate the paper size, number of copies, use of color printing or monochrome printing, and use of duplex printing.

FIG. 27 conceptually illustrates the structure of a settings data management table. The settings data management table stores the IP address, model number, and settings for each device in correlation with each function possessed by the devices, such as a photo print, Web print, and scan function. The settings data management table is stored in the storage unit 18. When the control unit 11 first launches the print-and-scan application on the data processing apparatus 1, no data is stored in the settings data management table. However, when the data processing apparatus 1 executes the print-and-scan application and performs a process using one of the functions of a device, the control unit 11 stores the model number, IP address, and settings for that device in the storage unit 18.

Figure 26:
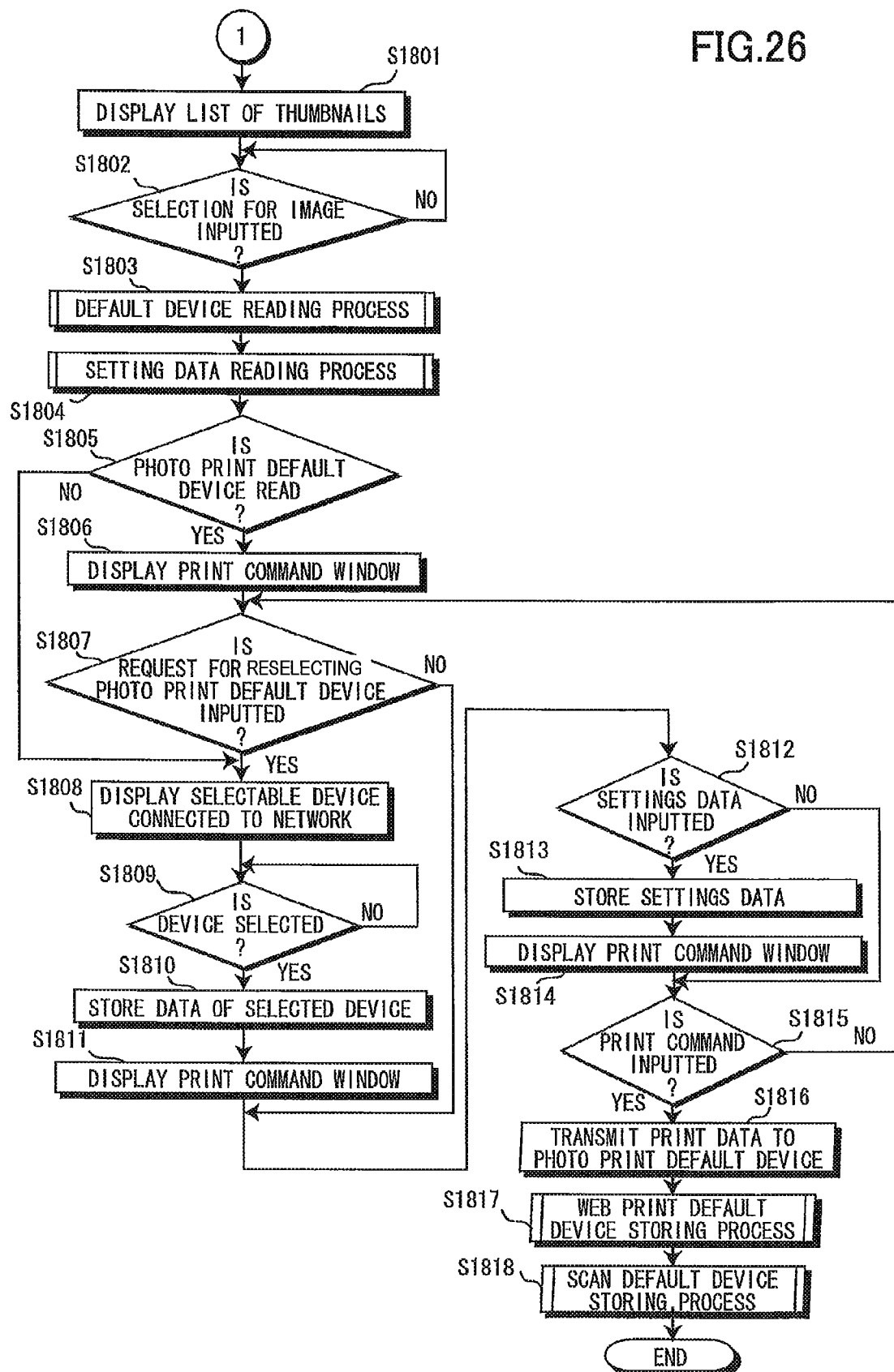
FIG. 26 is a flowchart illustrating steps in a part of controlling process executed by a data processing apparatus according the sixth embodiment of the invention.

Next, a process executed by the control unit 11 for controlling various components of the data processing apparatus 1 will be described with reference to FIGS. 26, 28, and 29. The following description assumes that "photo print" was selected in S601 of FIG. 14 (S601: photo print), causing the control unit 11 to proceed to branch "1".

In S1801 and S1802 at the beginning of the process shown in FIG. 18, the control unit 11 performs the same process described in S701 and S702 of FIG. 15A in the fourth embodiment. In S1803 the control unit 11 reads the device from the settings data management table stored in the storage unit 18 that is associated with "photo print." This process to read the default device in S1803 is a subroutine and will be described here with reference to FIG. 28.

In S2001 of FIG. 28 the control unit 11 references the settings data management table to determine whether the IP address and model number of a device are stored in correlation with "photo print." The control unit 11 advances to S2002 when an IP address and model number have been stored for a photo print device (S2001: YES) and ends the subroutine and advances to S1804 of FIG. 26 when such data has not been stored for "photo print" (S2001: NO).

In S2002 the control unit 11 reads the photo print default device. More specifically, the control unit 11 reads, as the IP address and model number for the photo print default device, the IP address and model number for the device stored in correlation with "photo print" from the settings data management table. Subsequently, the control unit 11 ends the subroutine and advances to S1804 of FIG. 26.

In S1804 of FIG. 26, the control unit 11 reads settings stored in the settings data management table in association with "photo print." The process to read settings in S1804 is a subroutine and will be described here with reference to FIG. 29. In S2101 at the beginning of the subroutine in FIG. 29, the control unit 11 references the settings data management table in the storage unit 18 and determines whether settings have been stored for "photo print." The control unit 11 advances to S2102 when settings have been stored for "photo print" (S2101: YES) and ends the subroutine and advances to S1805 of FIG. 26 when no settings have been stored (S2101: NO).

In S2102 the control unit 11 reads settings for the photo print process. More specifically, the control unit 11 reads the settings stored in the settings data management table associated with "photo print." Subsequently, the control unit 11 ends this subroutine and advances to S1805 of FIG. 26.

In S1805 the control unit 11 determines whether a photo print default device was read in S1803. The control unit 11 advances to S1806 when determining that a photo print default device was read (S1805: YES) and advances to S1808 when determining that a photo print default device was not read (S1805: NO).

Figures 30, 31:
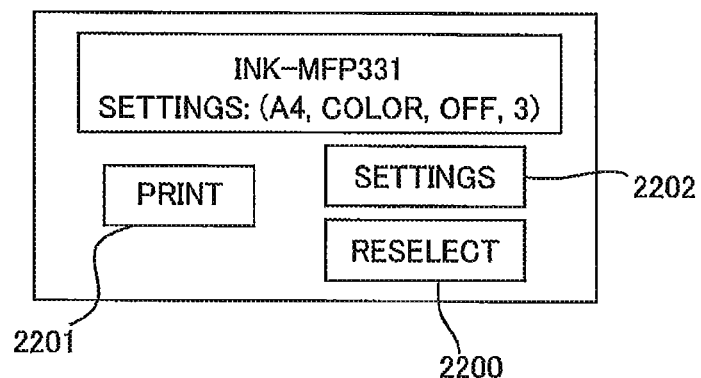
FIG. 30 is a diagram showing a print command window displayed on the data processing apparatus according to the sixth embodiment.
FIG. 31 is a diagram showing settings data stored in a data processing apparatus according to a modification of the sixth embodiment.

In S1806 the control unit 11 displays the Print Command window in the display area 101. FIG. 30 shows a sample Print Command window. The Print Command window in FIG. 30 differs from the Print Command window in the fourth embodiment shown in FIG. 15B in two aspects: the addition of a Settings icon 2202 to accompany a Reselect icon 2200 for issuing a request to reselect a default device, and a Print icon 2201 for issuing a print command; and the addition of settings related to the photo print process displayed together with the model number of the photo print default device. Hence, when displaying the Print Command window in the display area 101, the control unit 11 displays the settings read in S1804 in the Print Command window. However, if no settings were stored in the settings data management table in association with "photo print" (S2101: NO), the process for reading these settings in S2102 was not performed. In this case, the control unit 11 reads settings related to the photo print process that the print-and-scan application has pre-stored in the storage unit 18 as initial values, and displays these settings in the Print Command window. These initial values are stored in a region of the storage unit 18 separate from the region that holds the settings data management table when the print-and-scan application is first installed on the data processing apparatus 1. The initial values are not overwritten when the data processing apparatus 1 executes the print-and-scan application.

In S1807 the control unit 11 determines whether a request was received to reselect the photo print default device. That is, the control unit 11 determines whether the touch panel 103 inputted an electric signal corresponding to a region in which the Reselect icon 2200 is displayed. The control unit 11 advances to S1808 upon determining that the touch panel 103 inputted an electric signal corresponding to the region displaying the Reselect icon 2200 (S1807: YES) and advances to S1811 upon determining that such an electric signal was not inputted (S1807: NO).

The processes in S1808 and S1809 are identical to S706 and S707 of the fourth embodiment shown in FIG. 15A and will not be described here. In S1810 the control unit 11 stores the IP address and model number of the device selected in S1809 in regions of the settings data management table allocated for storing the IP address and model number associated with "photo print."

In S1811 the control unit 11 displays a Print Command window similar to that displayed in S1806 in the display area 101. At this time, the control unit 11 reads the model number and settings for the device corresponding to "photo print" from the settings data management table and displays this data in the Print Command window. When settings have not been stored in the settings data management table in association with "photo print," the control unit 11 reads the initial values stored for the photo print process, as was described in S1806, and displays these initial values in the Print Command window.

In S1812 the control unit 11 determines whether settings were inputted according to the following process. That is, the control unit 11 determines whether an instruction to change a setting was inputted based on whether the touch panel 103 inputted an electric signal corresponding to a region displaying the Settings icon 2202. Upon determining that a command was inputted to change the settings, the control unit 11 receives input for new settings. The method of receiving input for new settings is behind the scope of the present invention and will not be described here in detail, but the following method may be employed. The control unit 11 may display a list of selectable values for each setting option in the display area 101. When the touch panel 103 inputs an electric signal corresponding to an area of a displayed value, the control unit 11 determines that the user has inputted the value displayed in the region corresponding to the inputted electric signal. When the control unit 11 determines that a setting value was inputted (S1812: YES), in S1813 the control unit 11 stores the inputted value in a region of the settings data management table associated with "photo print." However, the control unit 11 advances to S1815 upon determining in S1812 that the touch panel 103 has not inputted an electric signal corresponding to the displayed region of the Settings icon 2202 (S1812: NO).

In S1814 the control unit 11 displays the Print Command window in the display area 101 according to the same process described in S1811.

In S1815 the control unit 11 determines whether a print command was received. Here, the control unit 11 determines whether an electric signal corresponding to the region in which the "Print" icon 2201 is displayed was inputted from the touch panel 103. The control unit 11 determines that a print command was inputted when an electric signal corresponding to the region in which the "Print" icon 2201 is displayed was inputted from the touch panel 103. The control unit 11 advances to S1816 upon determining that a print command was inputted (S1815: YES) and returns to S1807 upon determining that a print command was not inputted (S1815: NO).

In S1816 the control unit 11 reads the IP address and settings corresponding to "photo print" from the settings data management table. The control unit 11 controls the wireless communication unit 14 to transmit a request to the photo print default device having the IP address read from the settings data management table, requesting that the device print the image data selected in S1802 according to the settings read from the settings data management table. When settings have not been stored in the settings data management table in association with "photo print," the control unit 11 reads the initial values pre-stored in the storage unit 18 for the photo print process and transmits a request to the photo print default device to print the image data according to these initial values.

The subsequent processes in S1817 and S1818 are essentially the same as those described in S711 and S712 of the fourth embodiment. Only the differences between these processes will be described here. In the process to store identification data for the Web print default device of S1817, the regions for storing the IP address and the model number of the device correspond to the regions in the settings data management table for storing the IP address and model number associated with "Web print." Similarly, in the process to store identification data for the scan default device of S1818, the regions for storing the IP address and the model number of the device correspond to the regions in the settings data management table for storing the IP address and model number associated with "scan."

Figure 14:
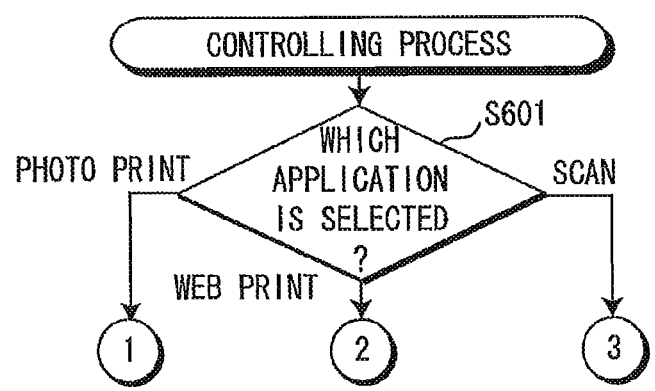

When "Web print" was selected in S601 of FIG. 14, the control unit 11 performs the same process described above with reference to FIG. 26, but replaces S1801, S1802, S1817, and S1818 with S801, S802, S811, and S812 of FIG. 16A. In this process, the control unit 11 reads the IP address, model number, and settings for a device from the region of the settings data management table corresponding to "Web print." When storing the IP address, model number, and settings for a device in this process, the control unit 11 stores this data in a region of the table corresponding to "Web print."

When "scan" was selected in S601 of FIG. 14, the control unit 11 performs the same process described above with reference to FIG. 26 with the following modifications. First, the control unit 11 skips S1801 and S1802. Next, the control unit 11 replaces S1817 and S1818 of FIG. 26 with S901 and S910 of FIG. 17A. When reading the IP address, model number, and settings for a device from the settings data management table, the control unit 11 reads this data from the region of the table corresponding to "scan"; and when storing this data for a device, the control unit 11 stores the data in the region of the table corresponding to "scan." In S1806, S1811, and S1814 of FIG. 26, the control unit 11 displays a Scan Command window instead of the Print Command window.

With the data processing apparatus 1 according to the sixth embodiment described above, the control unit 11 stores an IP address and model number in the storage unit 18 for each available function of the data processing apparatus 1, including a photo print, a Web print, and a scan operation. Accordingly, the user can employ a suitable device for each function.

Further, after the control unit 11 of the data processing apparatus 1 stores the IP address and model number for a default device suited to one function, the control unit 11 can store the same data as identification data for the default device for other functions after determining that the default device is suited for these functions. Thus, the data processing apparatus 1 reduces the number of steps that a user must perform in order to store data for devices suited to each available function.

Further, when the control unit 11 receives settings for a function, such as photo print, Web print, or scan (S1812: YES), the control unit 11 stores the received settings in the storage unit 18. Hence, the next time the user selects the same function, the control unit 11 can configure settings using the values read from the settings data management table, without requiring input from the user. This method can reduce the operational load on the user for inputting settings, since there is a high probability that the user will specify the same settings for each process performed with the same function.

The control unit 11 need not store the model number in the settings data management table, provided that the IP address is stored in the table as the device identification data.

It is also not necessary to use a table, such as the settings data management table, for storing the IP address, model number, and settings for a default device for each of the functions photo print, Web print, and scan. For example, the control unit 11 may store data including the device IP address, model number, and settings for each function in a prescribed region of the storage unit 18, as illustrated in FIG. 31. In this case, the control unit 11 may store a plurality of configurations for the same function or may store only the most recent configuration. The date and time may also be stored together with each configuration, regardless of whether the default devices are stored in a settings data management table.

While a mobile phone is used as an example of the processing apparatus in the first through sixth embodiments described above, the processing apparatus may be a personal computer, portable data terminal, or the like.

While only a single input interface 104 is provided in the data processing apparatus 1 shown in FIG. 1, the data processing apparatus 1 may be provided with a plurality of input interfaces 104 instead. In this case, where it is described in the first through sixth embodiments that the control unit 11 receives an electric signal from the touch panel 103, the control unit 11 may be configured to receive electric signals inputted from the plurality of input interfaces 104. Further, the functions of the touch panel 103 and input interfaces 104 may be combined.

The data processing apparatus 1 may be configured to communicate with devices through cables rather than wirelessly.

The devices 2 connected to the data processing apparatus 1 are not limited to the MFPs 2a and 2b, printers 2c and 2d, and scanners 2e and 2f shown in FIG. 2, provided that there are at least devices that possess a print function and a scan function.

The devices 2 may communicate with the access point 4 either through cables or wirelessly. Alternatively, the devices 2 may communicate directly with the data processing apparatus 1 rather than through the access point 4. In this case, the devices 2 may communicate with the data processing apparatus 1 either through cables or wirelessly.

Further, the process for prompting the user to select one of the devices (specifically, the processes in S104-S105 of FIGS. 6, 9, and 10; S706-S707 of FIG. 15A; S805-S807 of FIG. 16A; S904-S905 of FIG. 17A; S1605-S1606 and S1615-S1616 of FIG. 24; S1704-S1705 of FIG. 25; and S1808-S1809 of FIG. 26) can be rewritten as a process for prompting the user to specify a device. In other words, rather than displaying a plurality of devices as selections and prompting the user to choose one of the selections, the data processing apparatus may prompt the user to input a specific device without displaying any selections, for example. In other words, the user is asked to directly input information that uniquely identifies a desired device, such as the device name or IP address.

What is claimed is:

1. A non-transitory computer-readable storage medium storing a set of device control program instructions installed on and executed by a computer of a terminal device, the terminal device including the computer, a storage, and a display, the set of device control program instructions, when executed by the computer, causing the terminal device to perform:

displaying, on the display, a menu screen including a first menu item and a second menu item;

accepting, on the menu screen, a first menu selection operation to select either one of the first menu item and the second menu item;

after accepting the first menu selection operation, displaying, on the display, a device selection screen including an image configured to accept a device selection operation to select a device to execute a function indicated by the menu item selected in the first menu selection operation;

accepting the device selection operation on the device selection screen;

storing, in the storage, information of the device selected in the device selection operation;

after storing the information of the selected device in the storage, accepting, on the menu screen, a second menu selection operation to select either one of the first menu item and the second menu item from the menu screen; and in a case where a function indicated by the menu item selected in the second menu selection operation is different from the function indicated by the menu item selected in the first menu selection operation, displaying on the display an instruction-accepting image and device-candidate information, the instruction-accepting image being configured to accept an instruction operation to instruct execution of the function selected by the second menu selection operation, the device-candidate information being indicative of a device candidate, the device candidate being a candidate of a device to execute the function indicated by the menu item selected by the second menu selection operation, the device-candidate information including the information of the device selected in the device selection operation.

2. The non-transitory computer-readable storage medium according to claim 1, wherein the instruction-accepting image and the device-candidate information are displayed on the display in a case where the function indicated by the menu item selected in the second menu selection operation is different from the function indicated by the menu item selected in the first menu selection operation and the device selected in the device selection operation has both of the function indicated by the menu item selected in the first menu selection operation and the function indicated by the menu item selected in the second menu selection operation.

3. The non-transitory computer-readable storage medium according to claim 1, wherein in a case where information of another device that is different from the device selected in the device selection operation is already stored in the storage, the information of the device selected in the device selection operation is stored in the storage in addition to the already-stored information of the another device, and
wherein the device-candidate information includes the information of the device that is selected in the device selection operation.

4. The non-transitory computer-readable storage medium according to claim 3, wherein the set of device control program instructions, when executed by the computer, causes the terminal device to perform: in the case where the function indicated by the menu item selected in the second menu selection operation is different from the function indicated by the menu item selected in the first menu selection operation, further displaying on the display another instruction-accepting image configured to accept an instruction to change the device candidate from the device selected in the device selection operation to the another device.

5. A non-transitory computer-readable storage medium storing a set of device control program instructions installed on and executed by a computer of a terminal device, the terminal device including the computer, a storage, and a display,
the set of device control program instructions, when executed by the computer, causing the terminal device to perform:
displaying, on the display, a menu screen including a first menu item indicating a print function and a second menu item indicating a scan function;
accepting, on the menu screen, a first menu selection operation to select either one of the first menu item and the second menu item;
after accepting the first menu selection operation, displaying, on the display, a device selection screen including an image configured to accept a device selection operation to select a device to execute a function indicated by the menu item selected in the first menu selection operation;
accepting the device selection operation on the device selection screen;
storing, in the storage, information of the device selected in the device selection operation;
after storing the information of the selected device in the storage, accepting, on the menu screen, a second menu selection operation to select either one of the first menu item and the second menu item; and
in a case where a function indicated by the menu item selected in the second menu selection operation is different from the function indicated by the menu item selected in the first menu selection operation, displaying on the display an instruction-accepting image and device-candidate information, the instruction-accepting image being configured to accept an instruction operation to instruct execution of the function selected by the second menu selection operation, the device-candidate information being indicative of a device candidate, the device candidate being a candidate of a device to execute the function indicated by the menu item selected by the second menu selection operation,
the device-candidate information including the information of the device selected in the device selection operation.

6. A terminal device comprising:
a storage;
a display; and
a controller configured to perform:
displaying, on the display, a menu screen including a first menu item and a second menu item;

accepting, on the menu screen, a first menu selection operation to select either one of the first menu item and the second menu item;
after accepting the first menu selection operation, displaying a device selection screen on the display, the device selection screen including an image configured to accept a device selection operation to select a device to execute a function indicated by the menu item selected in the first menu selection operation;
accepting the device selection operation on the device selection screen;
storing, in the storage, information of the device selected in the device selection operation;
after storing the information of the selected device in the storage, accepting, on the menu screen, a second menu selection operation to select either one of the first menu item and the second menu item from the menu screen; and
in a case where a function indicated by the menu item selected in the second menu selection operation is different from the function indicated by the menu item selected in the first menu selection operation, displaying on the display an instruction-accepting image and device-candidate information, the instruction-accepting image being configured to accept an instruction operation to instruct execution of the function selected by the second menu selection operation, the device-candidate information being indicative of a device candidate, the device candidate being a candidate of a device to execute the function indicated by the menu item selected by the second menu selection operation,
the device-candidate information including the information of the device selected in the device selection operation.

7. A method for controlling a terminal device, the terminal device including a storage and a display, the method comprising:
displaying, on the display, a menu screen including a first menu item and a second menu item;
accepting, on the menu screen, a first menu selection operation to select either one of the first menu item and the second menu item;
after accepting the first menu selection operation, displaying on the display, a device selection screen including an image configured to accept a device selection operation to select a device to execute a function indicated by the menu item selected in the first menu selection operation;
accepting the device selection operation on the device selection screen;
storing, in the storage, information of the device selected in the device selection operation;
after storing the information of the selected device in the storage, accepting, on the menu screen, a second menu selection operation to select either one of the first menu item and the second menu item from the menu screen; and
in a case where a function indicated by the menu item selected in the second menu selection operation is different from the function indicated by the menu item selected in the first menu selection operation, displaying on the display an instruction-accepting image and device-candidate information, the instruction-accepting image being configured to accept an instruction operation to instruct execution of the function selected by the second menu selection operation, the device-candidate information being indicative of a device candidate, the device candidate being a candidate of a device to execute the function indicated by the menu item selected by the second menu selection operation, the device-candidate information including the information of the device selected in the device selection operation.

8. A non-transitory computer-readable storage medium storing a set of device control program instructions installed on and executed by a computer of a terminal device, the terminal device including the computer, a storage, and a display, the set of device control program instructions, when executed by the computer, causing the terminal device to perform:

displaying, on the display, a menu screen including a first menu item and a second menu item;

accepting, on the menu screen, a first menu selection operation to select either one of the first menu item and the second menu item;

after accepting the first menu selection operation, displaying, on the display, a device selection screen including an image configured to accept a device selection operation to select a device to execute a function indicated by the menu item selected in the first menu selection operation;

accepting the device selection operation on the device selection screen;

storing, in the storage, information of the device selected in the device selection operation;

after storing the information of the selected device in the storage, accepting, on the menu screen, a second menu selection operation to select either one of the first menu item and the second menu item from the menu screen; and in a case where a function indicated by the menu item selected in the second menu selection operation is different from the function indicated by the menu item selected in the first menu selection operation, displaying on the display device-candidate information indicative of a device candidate, the device candidate being a candidate of a device to execute the function indicated by the menu item selected by the second menu selection operation, the device-candidate information including the information of the device selected in the device selection operation.

9. The non-transitory computer-readable storage medium according to claim 8, wherein the set of device control program instructions, when executed by the computer, causes the terminal device to perform: in the case where the function indicated by the menu item selected in the second menu selection operation is different from the function indicated by the menu item selected in the first menu selection operation, further displaying on the display an instruction-accepting image configured to accept an instruction operation to instruct execution of the function selected by the second menu selection operation.

* * * * *